(12) United States Patent
Egi

(10) Patent No.: US 11,449,032 B2
(45) Date of Patent: Sep. 20, 2022

(54) METHOD FOR SETTING CONTROL PARAMETERS FOR MODEL PREDICTION CONTROL FOR CONTROL TARGET WITH INTEGRATOR

(71) Applicant: OMRON Corporation, Kyoto (JP)

(72) Inventor: Mamoru Egi, Otsu (JP)

(73) Assignee: OMRON CORPORATION, Kyoto (JP)

( * ) Notice: Subject to any disclaimer, the term of this patent is extended or adjusted under 35 U.S.C. 154(b) by 316 days.

(21) Appl. No.: 16/644,192

(22) PCT Filed: Jan. 11, 2019

(86) PCT No.: PCT/JP2019/000725
§ 371 (c)(1),
(2) Date: Mar. 4, 2020

(87) PCT Pub. No.: WO2019/139133
PCT Pub. Date: Jul. 18, 2019

(65) Prior Publication Data
US 2021/0064005 A1    Mar. 4, 2021

(30) Foreign Application Priority Data

Jan. 11, 2018   (JP) .............................. JP2018-002958

(51) Int. Cl.
*G05B 19/4155*   (2006.01)
*B25J 9/16*   (2006.01)
*G05B 13/04*   (2006.01)

(52) U.S. Cl.
CPC .......... *G05B 19/4155* (2013.01); *B25J 9/163* (2013.01); *B25J 9/1605* (2013.01); *G05B 13/048* (2013.01);
(Continued)

(58) Field of Classification Search
None
See application file for complete search history.

(56) References Cited

U.S. PATENT DOCUMENTS

2005/0209714 A1*  9/2005  Rawlings ............. G05B 13/048
                                                        700/44
2008/0036413 A1   2/2008  Ohta et al.
(Continued)

FOREIGN PATENT DOCUMENTS

JP   H09-328266 A   12/1997
JP   2017-102617 A   6/2017
WO   2013/140679 A1   9/2013

OTHER PUBLICATIONS

Tomatsu et al. 'Model Predictive Trajectory Tracking Control for Hydraulic Excavator on Digging Operation' 2015 IEEE Conference on Control Applications (CCA) Part of 2015 IEEE Multi-Conference on Systems and Control, Sep. 21-23, 2015.*
(Continued)

*Primary Examiner* — Bernard G Lindsay
(74) *Attorney, Agent, or Firm* — Metrolex IP Law Group, PLLC

(57) ABSTRACT

A setting method according to the present invention determines a desired time response in an optimum servo control structure corresponding to a servo control structure of a control target, calculates a predetermined gain corresponding to the desired time response, and calculates a first weighting coefficient Qf, a second weighting coefficient Q, and a third weighting coefficient R of a predetermined Riccati equation according to the Riccati equation on the basis of the predetermined gain. The first weighting coefficient Qf, the second weighting coefficient Q, and the third weighting coefficient R are set as a weighting coefficient corresponding to a terminal cost, a weighting coefficient corresponding to a state quantity cost, and a weighting
(Continued)

coefficient corresponding to a control input cost, respectively, in a predetermined evaluation function for model prediction control.

6 Claims, 17 Drawing Sheets

(52) U.S. Cl.
CPC .. *G05B 13/044* (2013.01); *G05B 2219/42058* (2013.01); *G05B 2219/50391* (2013.01)

(56) References Cited

U.S. PATENT DOCUMENTS

| | | | | |
|---|---|---|---|---|
| 2008/0208371 | A1* | 8/2008 | Vermillion | G05B 11/32 700/36 |
| 2012/0109620 | A1* | 5/2012 | Gaikwad | G05B 13/048 703/21 |
| 2014/0371899 | A1 | 12/2014 | Nagaoka | |
| 2015/0279124 | A1* | 10/2015 | Wong | G07C 5/00 701/99 |
| 2016/0098022 | A1* | 4/2016 | Wenzel | G05B 13/048 700/275 |
| 2017/0153614 | A1 | 6/2017 | Namie et al. | |
| 2019/0127049 | A1* | 5/2019 | Blanding | G05B 13/048 |

OTHER PUBLICATIONS

Extended European search report (EESR) dated Sep. 7, 2021 in a counterpart European patent application.

Sakurai, et al., "Offset Compensation of Continuous Time Model Predictive Control by Disturbance Estimation", Transactions of the Institute of Systems, Control and Information Engineers, 2012, pp. 172-180, vol. 25, No. 7, The Institute of Systems, Control and Information Engineers; concise explanation of relevance provided in the specification; relevance is indicated in the (translated) ISR/WO dated Apr. 9, 2019.

Maeder et al., "Linear offset-free Model Predictive Control", Automatica, 2009, pp. 2214-2222, vol. 45, No. 10, Elsevier; concise explanation of relevance provided in the specification; relevance is indicated in the (translated) ISR/WO dated Apr. 9, 2019.

Tahir et al., "Tuning of Performance Index in Nonlinear Model Predictive Control by the Inverse Linear Quadratic Regulator Design Method", SICE Journal of Control, Measurement, and System Integration, 2013, pp. 387-395, vol. 6, No. 6, SICE; concise explanation of relevance provided in the specification; relevance is indicated in the (translated) ISR/WO dated Apr. 9, 2019.

Sugimoto, "A Note on Polynomial ILQ Design Method and Two-Degree-of-Freedom Optimal Servo Systems", Transactions of the Institute of Systems, Control and Information Engineers, 1997, pp. 395-400, vol. 10, No. 8, The Institute of Systems, Control and Information Engineers; relevance is indicated in the (translated) ISR/WO dated Apr. 9, 2019.

Ohtsuka et al., "Practical applications of control by real-time optimization", Book (ISBN: 978-4-339-03210-9), 2015, pp. 1-21 and 174-199, Corona Publishing Co., Ltd., Tokyo; relevance is indicated in the (translated) ISR/WO dated Apr. 9, 2019.

Ohtsuka, "A continuation/GMRES method for fast computation of nonlinear receding horizon control", Automatica, 2004, pp. 563-574, vol. 40, Issue 4, Elsevier; relevance is indicated in the (translated) ISR/WO dated Apr. 9, 2019.

English translation of the International Search Report("ISR") of PCT/JP2019/000725 dated Apr. 9, 2019.

English translation of the Written Opinion("WO") of PCT/JP2019/000725 dated Apr. 9, 2019.

* cited by examiner

ADDED PORTION FOR ONE AXIS

PORTION CORRESPONDING TO WEIGHTING COEFFICIENT Q

ADDED PORTION FOR ONE AXIS

METHOD FOR SETTING CONTROL PARAMETERS FOR MODEL PREDICTION CONTROL FOR CONTROL TARGET WITH INTEGRATOR

TECHNICAL FIELD

The present invention relates to a method for setting control parameters for model prediction control.

BACKGROUND ART

Generally, feedback control is used in order to control a control target to track a command trajectory. For example, a control device of an articulated robot controls servo motors of respective joint shafts using feedback control so that the position of a hand of the robot tracks a command trajectory set (taught) in advance. However, general feedback control has a problem that since a response delay occurs inevitably in each servo motor, the actual trajectory of the robot deviates from the command trajectory. Techniques related to model prediction control are used to suppress such a deviation from the command trajectory.

However, even when model prediction control is used, a steady-state offset may occur if a target trajectory for a command changes frequently as in tracking control. Therefore, when a servo system is constructed using model prediction control, the steady-state offset may be eliminated by connecting an integrator to a compensator thereof in series. Moreover, the steady-state offset can be removed in principle by incorporating an assumed disturbance into the model by regarding the disturbance as a new state. For example, NPL 1 and NPL 2 propose methods for constructing a disturbance observer and cancelling a steady-state offset using a disturbance estimated by the disturbance observer.

CITATION LIST

Non Patent Literature

NPL 1: Yuta Sakurai and Toshiyuki Ohtsuka: Offset Compensation of Continuous Time Model Predictive Control By Disturbance Estimation; Journal of Institute of Systems, Control and Information Engineers, Vol. 25, No. 7, pp. 10-18 (2012)

NPL 2: U. Maeder and M. Morari: Linear offset-free model predictive control; Automatica, Vol. 45, No. 10, pp. 2214-2222 (2009)

NPL3: Fatima TAHIR and Toshiyuki OHTSUKA: Tuning of Performance Index in Nonlinear Model Predictive Control by the Inverse Linear Quadratic Regulator Design Method, SICE Journal of Control, Measurement, and System Integration, Vol. 6, No. 6, pp. 387-395, (2013)

SUMMARY OF INVENTION

Technical Problem

When model prediction control is performed for servo control in which an output of a control target is controlled to track a target command, an optimal control input is calculated according to a predetermined evaluation function. Generally, in the predetermined evaluation function, a terminal cost related to a state variable of the control target and a stage cost related to the state variable and the control input are calculated, and the control input is optimized so that the sum thereof is immunized. In this case, the weighting coefficients of the terminal cost and the stage cost are set in the evaluation function whereby the control input is optimized in a state in which a correlation of the costs is applied.

Here, the weighting coefficients of the model prediction control cannot easily find an immediate relationship with a time response of the control target of the model prediction control. Therefore, a user requires numerous trial-and-errors in determining the weighting coefficients for model prediction control. Although NPL 3 discloses a method for determining weighting coefficients for model prediction control by taking a time response of a control target into consideration when a regulator performs model prediction control, this method cannot deal with servo control.

The present invention has been made in view of the above-described problems, and an object thereof is to provide a technique for allowing a user to set weighting coefficients for model prediction control immediately on the basis of a time response of a control target when model prediction control is performed for servo control in which an output of a control target is controlled to track a target command.

Solution to Problem

In the present invention, in order to solve the problems, it is assumed that a system that linearizes a prediction model used in model prediction control near a terminal end and an optimum servo control structure corresponding to a control structure that performs servo control using the model prediction control output the same output with respect to the same control input. In this way, when model prediction control is performed for servo control using so-called an ILQ design method, a user can set weighting coefficients immediately on the basis of a time response of a control target.

Specifically, the present invention provides a method for setting control parameters for model prediction control (hereinafter, also referred to simply as a "control parameter setting method") related to a predetermined control target, the method being executed by a control device having a first integrator to which an offset between a predetermined target command and an output of the predetermined control target corresponding to an actual target device which is an actual target of servo control is input, in order to allow an output of the actual target device tracks the predetermined target command. The control device includes a model prediction control unit which has a prediction model that defines a correlation between a predetermined expanded state variable related to an expanded control target including at least the predetermined control target and a control input to the expanded control target in a form of a predetermined state equation and which performs the model prediction control based on the prediction model according to a predetermined evaluation function in a prediction section having a predetermined time width with respect to the predetermined target command and outputs a value of the control input at least at an initial time point of the prediction section. Moreover, a predetermined state variable which is a portion of the predetermined expanded state variable and is related to the predetermined control target includes a predetermined integral term represented by a product of the offset and a predetermined integral gain.

The setting method includes: a time response determining step of determining a desired time response in an optimum servo control structure which includes a virtual integrator virtually corresponding to the first integrator and is related to a virtual control target virtually corresponding to the expanded control target and in which, when a virtual target command for the virtual control target is r1, a virtual control input to the virtual control target is a virtual control input u1, and a virtual output of the virtual control target is y1, the virtual control input u1 is represented by Equation 1 below including a state feedback gain $K_F$ and an integral gain $K_I$; a gain calculation step of calculating the state feedback gain $K_F$ and the integral gain $K_I$ corresponding to the desired time response; a weighting coefficient calculation step of calculating a second weighting coefficient Q and a third weighting coefficient R among a first weighting coefficient Qf, the second weighting coefficient Q, and the third weighting coefficient R in a predetermined Riccati equation represented by Equation 3 below on the basis of the state feedback gain $K_F$ and the integral gain $K_I$ when the control input to the expanded control target is u, the output of the expanded control target is y, the offset is e, the predetermined state variable is x, and a state equation related to the predetermined control target is represented by Equation 2 below; and a setting step of setting the second weighting coefficient Q as a weighting coefficient corresponding to a state quantity cost which is a stage cost related to the predetermined state variable and setting the third weighting coefficient R as a weighting coefficient corresponding to a control input cost which is a stage cost related to the control input in the predetermined evaluation function.

Furthermore, in the weighting coefficient calculation step, the first weighting coefficient Qf may be further calculated. In this case, in the setting step, the first weighting coefficient Qf may be set as the weighting coefficient corresponding to the terminal cost related to the predetermined state variable.

[Math. 1]

$$u1 = -K_F x + K_I \int (r1 - y1) dt \quad \text{(Equation 1)}$$

$$\begin{cases} \dot{x} = Ax + Bu \\ \dot{z} = -Cx + r \end{cases}, \quad \text{(Equation 2)}$$

$$\begin{bmatrix} \dot{x} \\ \dot{z} \end{bmatrix} = \begin{bmatrix} A & 0 \\ -C & 0 \end{bmatrix} \begin{bmatrix} x \\ z \end{bmatrix} + \begin{bmatrix} B \\ O \end{bmatrix} u + \begin{bmatrix} 0 \\ r \end{bmatrix}$$

$$e = r - y = \dot{z}$$

$$Q_f A_e + A_e^T Q_f - Q_f B_e R^{-1} B_e^T Q_f + Q = 0 \quad \text{(Equation 3)}$$

$$\text{where } A_e = \begin{bmatrix} A & 0 \\ C & 0 \end{bmatrix}, B_e = \begin{bmatrix} B \\ 0 \end{bmatrix}$$

In the control parameter setting method of the present disclosure, weighting coefficients for model prediction control used for allowing a final output of an actual target device to track a predetermined target command are calculated by determining a time response of an output of a virtual control target (that is, a time response of an output of an expanded control target) in the optimum servo control structure according to Equation 1. That is, by using the control parameter setting method, a user can easily acquire weighting coefficients for model prediction control corresponding to the time response recognizable immediately and does not need to repeat trial-and-errors related to weighting coefficients for model prediction control for tracking a target command unlike the conventional technique. The predetermined control target may be an actual target device and may be an actual target model that models the actual target device. When the predetermined control target is an actual target model, the expanded control target is an expansion system model including the actual target model.

In the control parameter setting method, the expanded control target may include the predetermined control target only, and a portion of the predetermined expanded state variable may be identical to the predetermined state variable. The control parameter setting method according to the present disclosure can be applied to a form in which the expanded control target is identical to the predetermined control target, and therefore, a user does not need to repeat trial-and-errors related to weighting coefficients for model prediction control.

As another method, in the control parameter setting method, the control input may be a jerk input to the predetermined control target, and the expanded control target may include additional integrator that performs a predetermined integration process with respect to the jerk input in addition to the predetermined control target. In this case, the prediction model may define a correlation between the jerk input and the predetermined expanded state variable including the predetermined state variable related to the predetermined control target and a state variable related to the additional integrator. The control parameter setting method according to the present disclosure can be applied to a form in which the expanded control target includes additional integrator for the jerk input together with the predetermined control target, and therefore, a user does not need to repeat trial-and-errors related to weighting coefficients for model prediction control.

Furthermore, a filter unit that performs an attenuation process at a predetermined frequency with respect to a control input based on the predetermined target command may be included in the predetermined control target and the expanded control target including the additional integrator whereby a further expanded control target is formed in the control device, and the control parameter setting method according to the present disclosure may be the control parameter setting method for the model prediction control executed by the control device. In this case, a state variable related to the further expanded control target may include a state variable related to the filter unit in addition to the predetermined expanded state variable, and the prediction model may define a correlation between the jerk input and the predetermined expanded state variable and the state variable related to the filter unit. In the weighting coefficient calculation step, the second weighting coefficient Q and the third weighting coefficient R may be calculated on the basis of the state feedback gain $K_F$ and the integral gain $K_I$, and zeros may be added to the second weighting coefficient as a weighting coefficient corresponding to the state variable related to the filter unit so as to correspond to the further expanded control target to obtain a new second weighting coefficient. In the setting step, the new second weighting coefficient may set as the weighting coefficient corresponding to the state quantity cost and the third weighting coefficient R may be set as the weighting coefficient corresponding to the control input cost in the predetermined evaluation function.

Furthermore, in the weighting coefficient calculation step, the first weighting coefficient Qf, the second weighting coefficient Q, and the third weighting coefficient R corresponding to the expanded control target may be calculated on the basis of the state feedback gain $K_F$ and the integral gain $K_I$. In this case, in the setting step, the first weighting coefficient Qf may be further set as the weighting coefficient corresponding to the terminal cost in the predetermined evaluation function.

In these cases, the further expanded control target includes a filter unit in addition to the predetermined control target and the additional integrator, and a state variable related to the filter unit is applied to the prediction model for the model prediction control. In this way, with the model prediction control, it is possible to realize ideal tracking of the target command while suppressing vibration of the output of the predetermined control target. Here, the attenuation process itself by the filter unit is not to be substantially applied to optimization of the control input according to the predetermined evaluation function. Therefore, in the weighting coefficient calculation step, zeros may be added to the second weighting coefficient calculated for the expanded control target including the predetermined control target and the additional integrator as a weighting coefficient corresponding to the state variable related to the filter unit to obtain a new second weighting coefficient, which can be employed as a final weighting coefficient for the model prediction control. In this way, it is possible to eliminate user's trial-and-errors related to weighting coefficients for model prediction control.

The filter unit may be configured as a notch filter in which the predetermined frequency is used as a central frequency of the attenuation process or a low-pass filter in which the predetermined frequency is used as a cutoff frequency of the attenuation process. Moreover, the filter unit may be configured as a filter other than these filters.

Advantageous Effects of Invention

A user can set weighting coefficients for model prediction control immediately on the basis of a time response of a control target when model prediction control is performed for servo control in which an output of a control target is controlled to track a target command.

BRIEF DESCRIPTION OF DRAWINGS

FIG. 11 is a diagram illustrating an example of weighting coefficients corresponding to a state quantity cost in the third configuration example.

DESCRIPTION OF EMBODIMENTS

Application Example

Figure 1A:
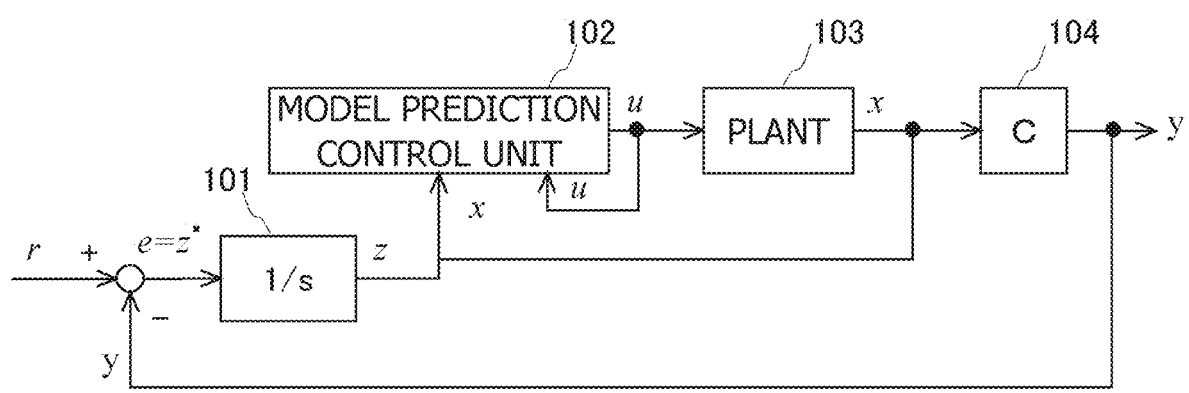
FIG. 1A is a diagram illustrating an example of a control structure to which a method for setting control parameters for model prediction control is applied.

An example of a scene in which a method for setting control parameters for model prediction control according to the present invention is applied will be described with reference to FIGS. 1A to 1C. FIG. 1A illustrates a control structure that executes tracking control (servo control) for causing an output y of a plant 103 which is a control target to track a target command r. In the control structure, model prediction control is executed by the model prediction control unit 102, whereby tracking control to the target command r is realized, a control input to the plant 103 calculated by the model prediction control is referred to as u, and a state variable related to the plant 103 used for calculation of the model prediction control is referred to as x.

In the control structure, an offset e (e=r−y) between the target command r and the output y of the plant 103 is input to a first integrator 101. An output z of the first integrator 101 is also included in the state variable x used for calculation of the model prediction control. Therefore, the model prediction control unit 102 performs model prediction control using the state variable x related to the plant 103 and the output z of the first integrator 101. Moreover, the state variable x related to the plant 103 is passed through a block 104 whereby the output y of the plant 103 is generated. Therefore, the state equation related to the actual plant 6 is represented by Equation 4 below.

[Math. 2]

$$\begin{cases} \dot{x} = Ax + Bu \\ \dot{z} = -Cx + r \end{cases}, \begin{bmatrix} \dot{x} \\ \dot{z} \end{bmatrix} = \begin{bmatrix} A & 0 \\ -C & 0 \end{bmatrix}\begin{bmatrix} x \\ z \end{bmatrix} + \begin{bmatrix} B \\ 0 \end{bmatrix}u + \begin{bmatrix} 0 \\ r \end{bmatrix} \quad \text{(Equation 4)}$$

where $e = r - y = \dot{z}$

Here, model prediction control executed by the model prediction control unit 102 will be described. The model prediction control unit 102 executes model prediction control (Receding Horizon control) using the state variable x including the output z of the first integrator 101 and the control input u to the plant 103 output by the model prediction control unit 102. The model prediction control unit 102 has a prediction model that defines a correlation between the state variable x and the control input u by the following state equation (Equation 5). Equation 5 below is a nonlinear state equation. Predetermined physical characteristics of the plant 103, for example, may be applied to the prediction model.

[Math. 3]

$$\dot{x}(t)=P(x(t)u(t)) \quad \text{(Equation 5)}$$

Here, the model prediction control unit 102 performs model prediction control based on the prediction model represented by Equation 5 according to the evaluation function illustrated in Equation 6 below in a prediction section having a predetermined time width T using the state variable x and the control input u as an input.

[Math. 4]

$$J=\varphi(x(t+T))+\int_t^{t+T} L(x(\tau),u(\tau))d\tau \quad \text{(Equation 6)}$$

The first term on the right side of Equation 6 is a terminal cost, and the second terminal on the right side is a stage cost. The terminal cost can be represented by Equation 7 below, and the stage cost can be represented by Equation 8 below.

[Math. 5]

$$\varphi(x(t+T))=(xref-x)^T(k)Qf(xref-x)(k) \quad \text{(Equation 7)}$$

[Math. 6]

$$L=\tfrac{1}{2}((xref-x)^T(k)Q(xref-x)(k)+(uref-u)^T(k)R(uref-u)(k)) \quad \text{(Equation 8)}$$

Here, xref (k) represents a target state quantity at time point k, x(k) represents a calculated state quantity at time point k, uref(k) represents a target control input in a normal state at time point k, and u(k) represents a calculated control input at time point k. Qf in Equation 7 is a coefficient (a weighting coefficient) indicating a weighting factor of a state quantity of the terminal cost. Moreover, Q and R in Equation 8 are a coefficient (a weighting coefficient) representing a weighting factor of a state quantity of the stage cost and a coefficient (a weighting coefficient) representing a weighting factor of a control input, respectively. Therefore, the first term on the right side of Equation 8 means a stage cost related to a state quantity and is referred to as a "state quantity cost", and the second term on the right side means a stage cost related to a control input and is referred to as a "control input cost".

A value of the control input u at initial time point t of the prediction section, calculated in the model prediction control on the basis of the above is output as a control input u to the plant 103 corresponding to the target command r at that time point t. In the model prediction control, a prediction section having a predetermined time width T is set at each control time point and the control input u at the control time point is calculated according to the evaluation function of Equation 6 and is supplied to the plant 103. A problem of calculating an operation amount that optimizes a value of an evaluation function J having such a form as in Equation 6 is a problem widely known as an optimal control problem, and an algorithm for calculating a numerical solution thereof is disclosed as a known technique. A continuous deformation method can be exemplified as such a technique, and the details thereof are disclosed, for example, in "A continuation/GMRES method for fast computation of nonlinear receding horizon control", T. Ohtsuka, Automatica, Vol. 40, pp. 563-574 (2004), for example.

In a continuous deformation method, an input U(t) to model prediction control is calculated by solving a simultaneous linear equation related to the input U(t) illustrated in Equation 9 below. Specifically, Equation 9 below is solved and dU/dt is numerically integrated to update the input U(t). In this manner, since the continuous deformation method does not perform repeated computation, it is possible to suppress a computational load for calculating the input U(t) at each time point as much as possible.

[Math. 7]

$$\frac{\partial F}{\partial U}\dot{U} = -\zeta F - \frac{\partial F}{\partial x}\dot{x} - \frac{\partial F}{\partial t} \quad \text{(Equation 9)}$$

Where F and U(t) are represented by Equation 10 below.

[Math. 8]

$$F(U(t), x(t), t) = \begin{bmatrix} \frac{\partial H}{\partial u}(x_0^*(t), u_0^*(t), \lambda_1^*(t), \mu_0^*(t)) \\ C(x_0^*(t), u_0^*(t)) \\ \ldots \\ \frac{\partial H}{\partial u}(x_{N\_1}^*(t), u_{N\_1}^*(t), \lambda_N^*(t), \mu_{N\_1}^*(t)) \\ C(x_{N\_1}^*(t), u_{N\_1}^*(t)) \end{bmatrix} \quad \text{(Equation 10)}$$

$$U(t) = [u_0^{*T}(t), \mu_0^{*T}(t), \ldots, u_{N\_1}^{*T}(t), \mu_{N\_1}^{*T}(t)]$$

Where H is a Hamiltonian, λ is a costate, and μ is a Lagrange multiplier of constraints C=0.

Next, a method for setting the terminal cost of the evaluation function and the weighting coefficient related to the stage cost will be described. The setting method includes a time response determining step, a gain calculation step, a weighting coefficient calculation step, and a setting step.

(Time Response Determining Step)

Figure 1B:
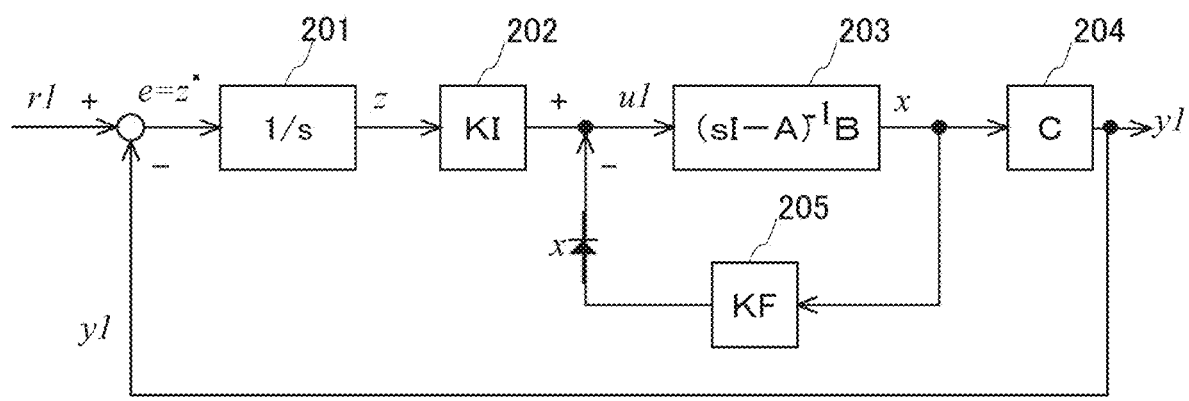
FIG. 1B is a diagram illustrating an optimal servo structure corresponding to the control structure illustrated in FIG. 1A.
Figure 1C:
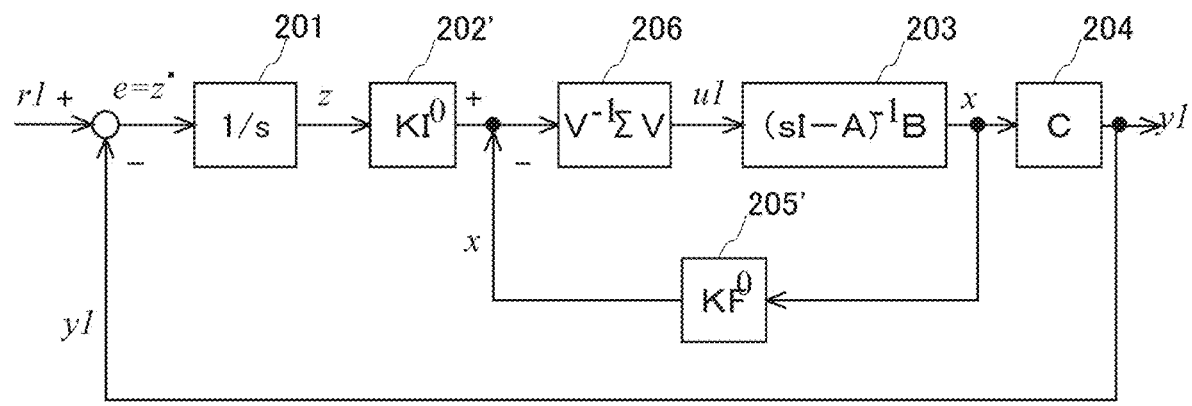
FIG. 1C is an integration-type ILQ servo control structure obtained by reconstructing the optimal servo structure illustrated in FIG. 1B.

Here, an optimal servo structure related to a virtual plant virtually corresponding to the plant 103 is illustrated in FIG. 1B. The optimal servo structure includes a virtual integrator 201 virtually corresponding to the first integrator 101, a virtual plant 203 virtually corresponding to the plant 103, and a virtual block 204 virtually corresponding to the block 104. When a virtual target command is r1, a virtual control input to the virtual plant 203 is a virtual control input u1, and an output of the virtual plant 203 is y1, a virtual control input u1 is represented by Equation 11 below. Here, $K_F$ is a state feedback gain and $K_I$ is an integral gain.

[Math. 9]

$$u1=-K_Fx+K_I\int(r1-y1)dt \quad \text{(Equation 11)}$$

The optimal servo structure formed in this manner corresponds to a structure in which a prediction model of the control structure illustrated in FIG. 1A is linearized near a terminal end. As a result, in the control structure of FIG. 1A and the optimal servo structure of FIG. 1B, when the variables x, z, and u which are evaluation items and the weighting coefficients Qf, Q, and R are focused on, the input/output of the optimal servo structure can be correlated with the input/output of the control structure illustrated in FIG. 1A (that is, the input/output of the control structure in which model prediction control is performed by the model prediction control unit 102). Based on this fact, first, in the time response determining step, a desired time response of the optimal servo structure is determined. That is, this determination substantially means determining a time response that is expected to be realized in the control structure illustrated in FIG. 1A.

(Gain Calculation Step)

Subsequently, in the gain calculation step, a state feedback gain $K_F$ and an integral gain $K_I$ of the optimal servo structure corresponding to the desired time response determined in the statistic process are calculated. Calculates of these gains are realized using a method (hereinafter referred to as a "reconstruction method") of reconstructing an optimum servo control structure illustrated in FIG. 1B an integration-type ILQ servo control structure illustrated in FIG. 1C. Components common with the optimal servo structure of FIG. 1B and the integration-type ILQ servo control structure of FIG. 1C will be denoted by the same reference numerals, and the description thereof will be omitted. A difference of the integration-type ILQ servo control structure of FIG. 1C from the optimum servo control structure of FIG. 1B is that a gain adjustment parameter block 206 common to the state feedback gain $K_F$ and the integral gain $K_I$ are tied up, and as a result, in the integration-type ILQ servo control structure, the gains are represented by a first reference optimal gain $K_F^0$ (indicated by 205') and a second reference optimal gain $K_I^0$ (indicated by 202') which are reference optimal gains. Moreover, the adjustment parameter of the block 206 is represented by Equation 12 below, and $\Sigma$ in the equation is a responsiveness matrix designating a time responsiveness in a first-order lag form, and V is a non-interference matrix for simplifying computation. When the integration-type ILQ servo control structure is reconstructed by such a reconstruction method, the state feedback gain $K_F$ and the integral gain $K_I$ for realizing a time response ideally approximated in the first-order lag form to the time response determined through the determination of the adjustment parameter and the calculation of the first reference optimal gain $K_F^0$ and the second reference optimal gain $K_I^0$ are calculated.

[Math. 10]

$$\text{Adjustment parameter} = V^{-1}\Sigma V \quad \text{(Equation 12)}$$

(Weighting Coefficient Calculation Step)

Subsequently, in the weighting coefficient calculation step, based on the fact that the state equation related to the plant 103 is represented by Equation 4 described above, a first weighting coefficient Qf, a second weighting coefficient Q, and a third weighting coefficient R of a predetermined Riccati equation is calculated according to the Riccati equation represented by Equation 13 below on the basis of the state feedback gain $K_F$ and the integral gain $K_I$ calculated in the gain calculation step.

[Math. 11]

$$Q_f A_e + A_e^T Q_f - Q_f B_e R^{-1} B_e^T Q_f + Q = 0 \quad \text{(Equation 13)}$$

$$\text{where } A_e = \begin{bmatrix} A & 0 \\ C & 0 \end{bmatrix}, B_e = \begin{bmatrix} B \\ 0 \end{bmatrix}$$

(Setting Step)

The present applicant has found that the first weighting coefficient Qf, the second weighting coefficient Q, and the third weighting coefficient R calculated in the weighting coefficient calculation step can be ideally used as the weighting coefficients of the evaluation function represented by Equations 7 and 8. Therefore, in the setting step, the first weighting coefficient Qf is set as the weighting coefficient corresponding to the terminal cost of the evaluation function, the second weighting coefficient Q is set as the weighting coefficient corresponding to the state quantity cost, and the third weighting coefficient R is set as the weighting coefficient corresponding to the control input cost.

According to such a control parameter setting method, a user can immediately set the weighting coefficients Qf, Q, and R of the evaluation function with respect to the time response of the plant 103 expected by the model prediction control, and therefore, can alleviate the load related to a parameter setting operation of the user. When the model prediction control unit 102 performs model prediction control through such parameter setting, an integration amount serving as a driving source of servo control is adjusted ideally in the servo control for tracking using the model prediction control, and it is possible to realize servo control suppressing an overshoot without using a disturbance observer which requires difficult adjustment such as expansion of a disturbance model or design of an observer gain as in the conventional technique.

First Configuration Example

Figure 2:
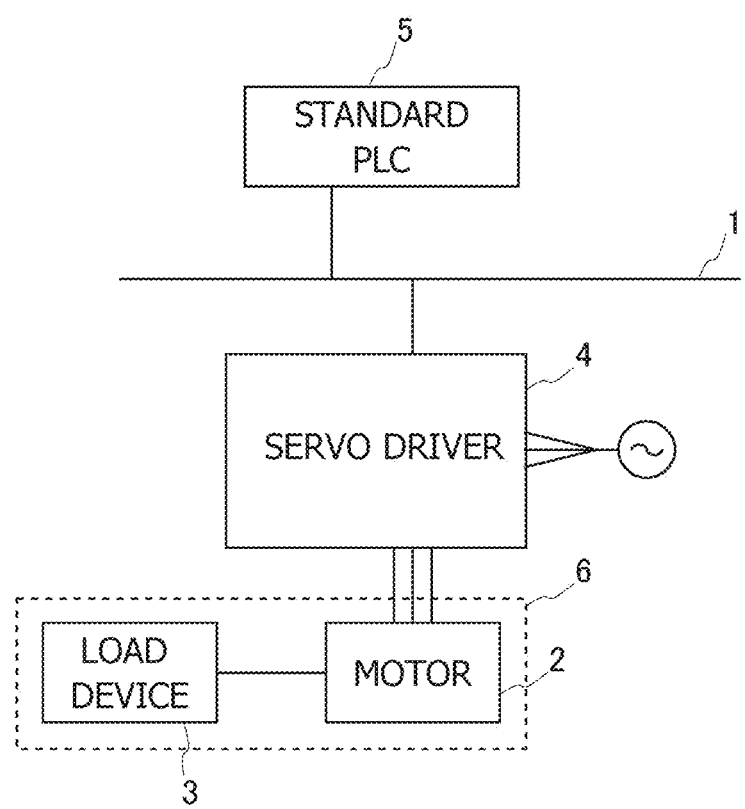
FIG. 2 is a diagram illustrating a control structure of a servo driver according to a first configuration example.

FIG. 2 is a diagram illustrating an overall configuration of a control system according to a first configuration example. The control system includes a network 1, a servo driver 4, and a standard PLC (Programmable Logic Controller) 5. The servo driver 4 is a control device that executes model prediction control for servo-controlling an actual plant (hereinafter simply referred to as an "actual plant") 6 including a motor 2 and a load device 3. In the control system, the servo driver 4 performs servo control involving model prediction control with respect to the actual plant 6 so that the output of the actual plant 6 tracks a target command transmitted from the standard PLC 5. With this model prediction control, the servo driver 4 generates a control input for performing servo control of the actual plant 6 on the basis of the target command received from the standard PLC 5. Generation of the control input by the servo driver 4 will be described later. In this case, examples of the load device 3 that constitutes the plant 6 include various machine apparatuses (for example, an industrial robot arm and a conveying apparatus), and the motor 2 is incorporated in the load device 3 as an actuator that drives the load device 3. For example, the motor 2 is an AC servo motor. An encoder (not illustrated) is attached to the motor 2, and a parameter signal (a position signal, a velocity signal, and the like) related to an operation of the motor 2 is transmitted to the servo driver 4 as a feedback signal by the encoder.

The standard PLC 5 generates a target command related to an operation (motion) of the plant 6 and transmits the same to the servo driver 4. The servo driver 4 receives the target command from the standard PLC 5 via the network 1 and receives the feedback signal output from the encoder connected to the motor 2. The servo driver 4 supplies a driving current to the motor 2 so that the output of the plant 6 tracks the target command. The supplied current is an AC power delivered from an AC power supply to the servo driver 4. In the present embodiment, the servo driver 4 is a type that receives a three-phase AC power but may be a type that receives a single-phase AC power.

Figure 3:
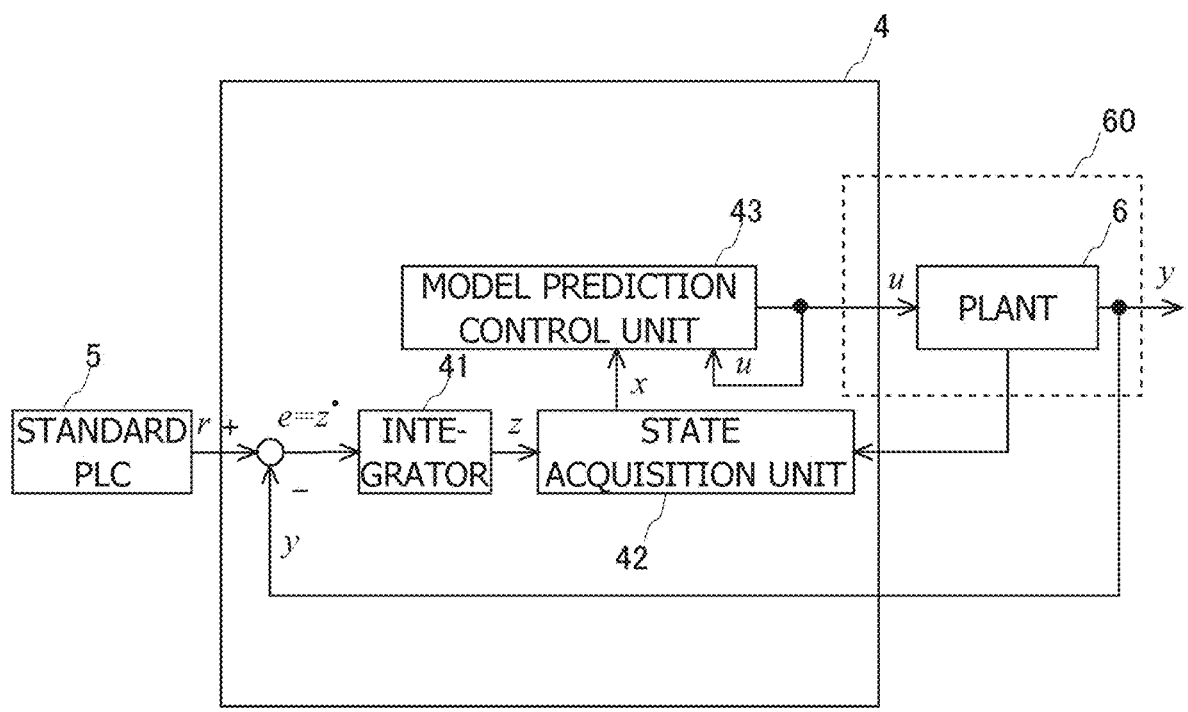
FIG. 3 is a diagram illustrating a control structure of a servo driver according to the first configuration example.

Here, the servo driver 4 has a control structure illustrated in FIG. 3 in order to realize the servo control of the actual plant 6. The target command supplied from the standard PLC 5 to the servo driver 4 is referred to as r. The servo driver 4 includes a first integrator 41, a state acquisition unit 42, and a model prediction control unit 43. The processes performed by the first integrator 41, the state acquisition unit 42, and the model prediction control unit 43 are computed and executed by an arithmetic processing device mounted in the servo driver 4. In the control structure of the servo driver 4, an offset e (e–r–y) between the target command r transmitted from the standard PLC 5 and the output y of the actual plant 6 fed back by a feedback system is input to the first integrator 41. The output z of the first integrator 41 is input to the model prediction control unit 43 through the state acquisition unit 42.

Here, the state acquisition unit 42 acquires a state variable x including the state related to the actual plant 6 and the output z of the first integrator 41, provided to the model prediction control performed by the model prediction control unit 43. For example, the state acquisition unit 42 can acquire predetermined information generated from an output signal of the encoder connected to the motor 2 included in the actual plant 6 as the state variable included in the state x. Moreover, a predetermined parameter (for example, the position of an output unit of the load device 3) related to the load device 3 included in the actual plant 6 may be acquired as the state variable x. Furthermore, in the present embodiment, the state acquisition unit 42 also acquires the output z of the first integrator 41 as the state variable included in the state x. The model prediction control unit 43 executes model prediction control (Receding Horizon control) using the state variable x acquired by the state acquisition unit 42 and a control input u to the actual plant 6 input by the model prediction control unit 43.

In the present specification, a virtual control configuration to which the control input u is input and which includes at least the actual plant 6 is formed as an expanded plant 60. The expression "expanded" as used herein means that the actual plant 6 solely or a combination with the actual plant 6 is regarded as a virtual control target. The expanded plant 60 is also referred to as an "expanded plant 60". In the control structure illustrated in FIG. 3, a control configuration other than the actual plant 6 is not included in the expanded plant 60 and the expanded plant 60 and the actual plant 6 are identical. However, FIG. 6 to be described later, for example, illustrates an example in which the actual plant 6 and a second integrator 6a are included in the expanded plant 60. The output of the expanded plant 60 is identical to the output of the actual plant 6.

Here, returning to FIG. 3, an offset e between the command r and the output y of the expanded plant 60 is input to the first integrator 41, and the output z of the first integrator 41 is input to the model prediction control unit 43 through the state acquisition unit 42 whereby the model prediction control is performed. Based on the control structure including the first integrator 41, the prediction model included in the model prediction control unit 43 is formed as illustrated in Equation 14 below, for example. Predetermined physical characteristics of the actual plant 6 are applied to Equation 14.

[Math. 12]

$$\dot{x}(t) = P(x(t), u(t)) \quad \text{(Equation 14)}$$

$$= \begin{bmatrix} \dot{x}_1 \\ \ddot{x}_1 \\ \dot{z}_1 \end{bmatrix}$$

$$= \begin{bmatrix} \dot{x}_1 \\ \dfrac{u_1}{M_1} \\ (x_{f1} - x_1) \cdot K_{i1} \end{bmatrix}$$

A subscript "1" in Equation 14 indicates the number of control axes controlled by the servo driver 4, and in the present embodiment, since the number of control axes is 1, the subscripts of the respective variables of the prediction model illustrated in Equation 14 are "1". A state variable $x_1$ indicates an output position of the actual plant 6 and is a parameter fed back as the output y of the actual plant 6. Moreover, $x_{f1}$ indicates a position command r to the control axis. Therefore, $(x_{f1}-x_1)$ in the prediction model indicates the offset e. It can be understood that the prediction model includes an integral term represented by a product of the offset e $(=x_{f1}-x_1)$ and a predetermined integral gain $K_{i1}$. In this way, it is easy to adjust an integration amount serving as a driving source of the servo control performed by the servo driver 4 which uses model prediction control, and it is easy to realize servo control suppressing an overshoot without using a disturbance observer which requires difficult adjustment such as expansion of a disturbance model or design of an observer gain as in the conventional technique.

Furthermore, in the servo driver 4, the predetermined integral gain $K_{i1}$ of the integral term included in the prediction model illustrated in Equation 14 may be adjusted on the basis of the offset e. Specifically, the predetermined integral gain $K_{i1}$ is adjusted so that the value of the predetermined integral gain $K_{i1}$ increases as the magnitude of the offset e decreases. For example, the transition of the predetermined integral gain $K_{i1}$ may be set so that the predetermined integral gain $K_{i1}$ is 0 when the magnitude of the offset e is equal to or larger than a predetermined threshold, the value of the predetermined integral gain $K_{i1}$ approaches abruptly 1 as the magnitude of the offset e approaches 0 when the magnitude of the offset e is smaller than the predetermined threshold, and the predetermined integral gain $K_{i1}$ is 1 which is the largest value when the magnitude of the offset e is 0. In this manner, since the predetermined integral gain $K_{i1}$ can be adjusted on the basis of the magnitude of the offset e, when an output y $(x_1)$ of the expanded plant 60 (the actual plant 6) deviates far from a command $x_{f1}$, the value of the predetermined integral gain $K_{i1}$ is adjusted to be small, and an integration amount for servo control is adjusted so as not to accumulate. Moreover, since the value of the predetermined integral gain $K_{i1}$ is adjusted to be large when the amount of deviation of the output $y(x_1)$ of the expanded plant 60 (the actual plant 6) from the command $x_{f1}$ decreases (that is, the magnitude of the offset e decreases), it is possible to effectively enhance the trackability of servo control. By varying the value of the predetermined integral gain $K_{i1}$ in this manner, it is possible to achieve both suppression of an overshoot and improvement in the trackability of servo control.

In adjustment of the predetermined integral gain $K_{i1}$, data related to correlation between the offset e and the predetermined integral gain $K_{i1}$ may be stored in the memory of the servo driver 4, and in that case, the predetermined integral gain $K_{i1}$ is adjusted by accessing the data.

Figure 4:
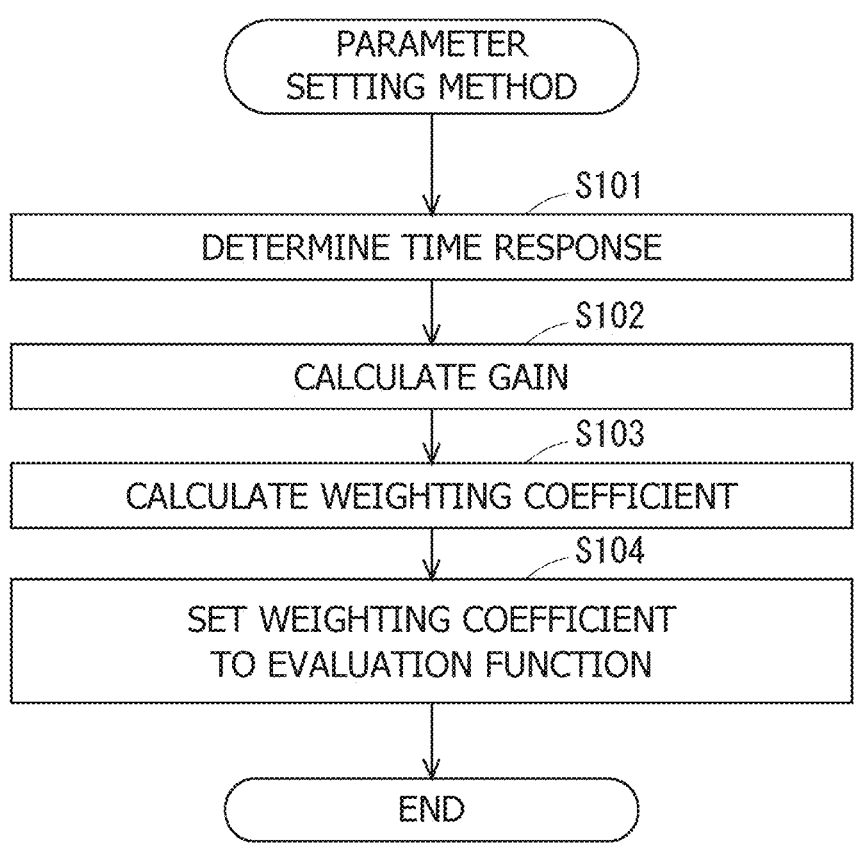
FIG. 4 is a diagram illustrating the flow of a method for setting weighting coefficients (control parameters) of an evaluation function for model prediction control executed in the servo driver according to the first configuration example.

Here, in order to realize the model prediction control by the servo driver 4 having the control structure illustrated in FIG. 3, it is necessary to appropriately set the control parameters related to the model prediction control (that is, the weighting coefficients (the first, second, and third weighting coefficients Qf, Q, and R) of the evaluation function illustrated in Equations 6 to 8). Therefore, a parameter setting method of setting these weighting coefficients to the evaluation function will be described with reference to FIG. 4. FIG. 4 is a diagram illustrating the flow of a parameter setting method, and this method includes a time response determining step, a gain calculation step, a weighting coefficient calculation step, and a setting step.

First, a time response determining step performed in S101 will be described. In the time response determining step, as described above, a desired time response of the optimal servo structure illustrated in FIG. 1B (that is, a time response that is expected to be realized in the control structure illustrated in FIG. 1A) is determined. Specifically, a relative order di and a non-interference matrix D of the optimal servo structure are calculated according to Equation 15 below.

[Math. 13]

$$D = \begin{bmatrix} c_1 A^{d_1-1} B \\ \cdots \\ c_m A^{d_m-1} B \end{bmatrix},$$

$$d_i := \min\{k : c_i A^{k-1} B \neq 0\} (1 \leq i \leq m)$$

(Equation 15)

Subsequently, a stabilization polynomial $\Phi i(s)$ of order di having a root of a pole si defined as a reciprocal of a time constant Ti based on the desired time response of the optimal servo structure is set according to Equation 16 below.

[Math. 14]

$$\varnothing_i(s) = (s-s_i)^{d_i}, s_i = -1/T_i$$

(Equation 16)

Therefore, in the time response determining step, the above-described process is performed on the basis of the time response in the optimal servo structure set by taking the time response expected to be realized in the control structure illustrated in FIG. 1A into consideration.

Next, the gain calculation step performed in S102 will be described. In the gain calculation step, the state feedback gain $K_F$ and the integral gain $K_I$ of the optimal servo structure are calculated. For this, first, a non-interference gain K is calculated on the basis of Equation 17 below.

[Math. 15]

$$K = D^{-1} N_\phi, N_\phi := \begin{bmatrix} c_1 \varnothing_1(A) \\ \cdots \\ c_m \varnothing_m(A) \end{bmatrix}$$

(Equation 17)

Subsequently, the first reference optimal gain $K_F^0$ and the second reference optimal gain $K_I^0$ of the integration-type ILQ servo control structure (see FIG. 10) obtained by reconstructing the optimal servo structure according to the reconstruction method are calculated on the basis of Equation 18 below.

[Math. 16]

$$[K_F^0 \ K_I^0] = [K \ I]\Gamma^{-1}$$

$$= (CA_K^{-1}B)^{-1}[CA_K^{-1} \ -I]$$

where $\Gamma = \begin{bmatrix} A & B \\ C & 0 \end{bmatrix}$ $A_K = A - BK$ (Equation 18)

Based on the fact that the state feedback gain $K_F$ and the integral gain $K_I$ are represented by Equation 19 below, a matrix $\Sigma$ of the adjustment parameter is determined according to the following procedures. The matrix V of the adjustment parameter is a unit matrix I as a non-interference matrix.

[Math. 17]

$$[K_F K_I] = V^{-1} \Sigma V [K_F^0 K_I^0]$$

(Equation 19)

($\Sigma$ Determination Procedure)
(Procedure 1)

A maximum eigenvalue $\lambda$max of a symmetric matrix $KB+(KB)^T$ is obtained, and the range of values of that constitute the matrix $\Sigma$ is determined as Equation 20 below.

[Math. 18]

$$\sigma \in \Sigma_a = \{\sigma > 0 | \sigma > \lambda_{max}[KB+(KB)^T]\} \text{ where } \Sigma = \text{diag}\{\sigma_1, \ldots, \sigma_m\}$$

(Equation 20)

(Procedure 2)

Subsequently, one of the values $\sigma$ in the range calculated in Procedure 1 is selected, and a target correction matrix E represented by Equation 21 below is calculated.

[Math. 19]

$$E = \sigma I - KB - (KB)^T$$

(Equation 21)

(Procedure 3)

Subsequently, the eigenvalues of the matrix F represented by Equation 22 below are calculated and the stability thereof is determined. The flow proceeds to the subsequent procedure 4 if the determination result shows that the matrix F is stable, and the flow returns to Procedure 2 if the matrix F is unstable. In this case, the value of $\sigma$ is set to a larger one in the above-mentioned range.

[Math. 20]

$$F = A_K + GH$$

where $G = BE^{-1/2}, H = E^{-1/2} K A_K$ (Equation 22)

(Procedure 4)

Subsequently, the eigenvalues of a Hamiltonian matrix H represented by Eq 23 below are cald and it is determined whether these eigenvalues are on an imaginary axis. The value of $\sigma$ is decreased when the eigenvalues are not present on the inverse matrix operation, and the value of $\sigma$ is increased when any one eigenvalue is on the inverse matrix operation. After that, the flow returns to Procedure 2.

[Math. 21]

$$\Pi = \begin{bmatrix} F & -GG^T \\ H^T H & -F^T \end{bmatrix}$$

(Equation 23)

(Procedure 5)

When Procedures 1 to 4 are repeated and an update width of σ is equal to or smaller than a predetermined value, the value of σ is set as a lower-limit value σmin. The respective values σi constituting the matrix Σ are selected within the range of σi>σmin to determine the matrix Σ.

Next, the weighting coefficient calculation step performed in S103 will be described. In the weighting coefficient calculation step, the weighting coefficients of the evaluation function (see Equations 6 to 8) for model prediction control are calculated on the basis of a predetermined Riccati equation of an expanded offset system. Specifically, the weighting coefficients are calculated according to Procedures 6 to 9 below.

(Procedure 6)

Matrices V and R are determined as Equation 24 below.

[Math. 22]

$$V=I, R=V^{-1}\Sigma^{-1}V=\Sigma^{-1}, \Sigma=\text{diag}\{\sigma_1, \ldots, \sigma_m\} \quad \text{(Equation 24)}$$

(Procedure 7)

Furthermore, matrices Kv and Bv are calculated by Equation 25 below.

[Math. 23]

$$K_V = VK = K = D^{-1}N_\phi = \begin{bmatrix} c_1 A^{d_1-1} B \\ \ldots \\ c_m A^{d_m-1} B \end{bmatrix} \begin{bmatrix} c_1 \phi_1(A) \\ \ldots \\ c_m \phi_m(A) \end{bmatrix},$$

$$B_V = BV^{-1} = B$$

(Equation 25)

Matrices Σ and Y satisfying Equation 26 below are calculated. When the matrix Σ determined in Procedure 5 satisfies Equation 26 below, the value is used as the value of the matrix Σ in Procedure 7 as it is. When the matrix Σ does not satisfy Equation 26, the values of constituting the matrix Σ are increased.

[Math. 24]

$$E = \Sigma - K_V B_V - (K_V B_V)^T > 0$$

$$YF + F^T Y + YGG^T Y + H^T H < 0$$

where $$F = A_K + GH, \text{Re}\lambda(F) < 0, A_K = A - BK$$

$$G = B_V E^{-1/2}, H = E^{-1/2} K_V A_K \quad \text{(Equation 26)}$$

(Procedure 8)

Candidates for a solution Qf of a Riccati equation of an expanded offset system represented by Equation 27 below are calculated as Equation 28 below.

[Math. 25]

$$Q_f A_e + A_e^T Q_f - Q_f B_e R^{-1} B_e^T Q_f + Q = 0 \quad \text{(Equation 27)}$$

where $A_e = \begin{bmatrix} A & 0 \\ C & 0 \end{bmatrix}, B_e = \begin{bmatrix} B \\ 0 \end{bmatrix}$

[Math. 26]

$$Q_f = T_e^{-T} \overline{Q_f} T_e^{-1} \quad \text{(Equation 28)}$$

where $$\overline{Q_f} = \begin{bmatrix} Y & 0 \\ 0 & I \end{bmatrix}, T_e = \Gamma \begin{bmatrix} I & 0 \\ -K & I \end{bmatrix}$$

Based on Equation 27 and the result of Equation 28, a matrix Q is calculated as Equation 29 below.

[Math. 27]

$$Q = Q_f B_e R^{-1} B_e^T Q_f - Q_f A_e - A_e^T Q_f \quad \text{(Equation 29)}$$

Next, the setting step performed in S104 will be described. In the setting step, the matrix Qf calculated according to Equation 28 is set as the weighting coefficient Qf (see Equation 7) corresponding to the terminal cost. Furthermore, the matrix Q calculated according to Equation 29 is set as the weighting coefficient Q corresponding to the state quantity cost, and the matrix R illustrated in Equation 24 is set as the weighting coefficient R corresponding to the control input cost (see Equation 8).

Figure 5:
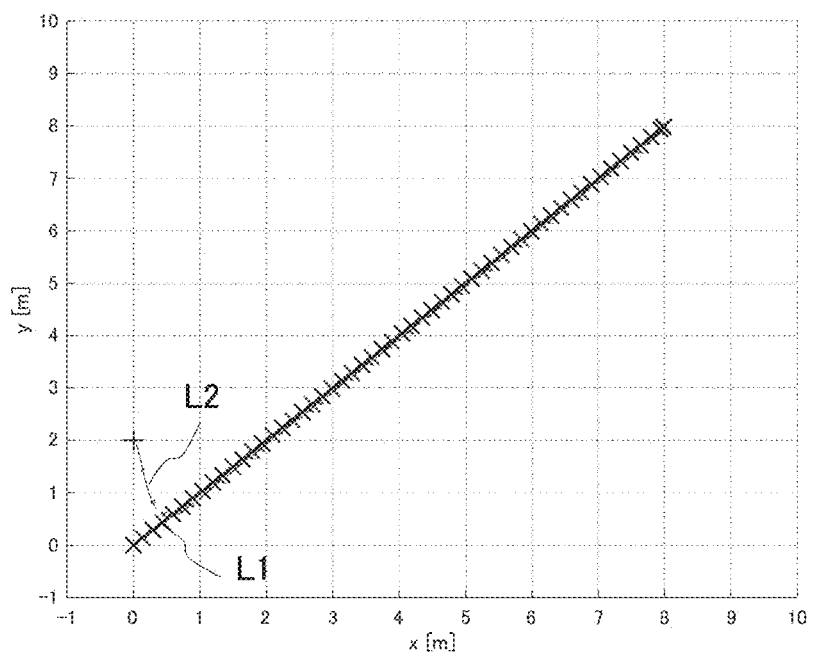
FIG. 5 is a diagram illustrating the result of trackability when an actual plant having two control axes is servo-controlled by the servo driver according to the first configuration example.

According to the parameter setting method illustrated in FIG. 4, a user can set the weighting coefficients Qf, Q, and R of the evaluation function for model prediction control immediately with respect to the time response of the actual plant 6 expected by the model prediction control and therefore can alleviate the load related to a parameter setting operation of the user. Since the model prediction control is performed through such parameter setting, an integration amount serving as a driving source of servo control which uses the model prediction control is adjusted ideally, and servo control which suppresses an overshoot can be realized. FIG. 5 illustrates a simulation result when the control structure illustrated in FIG. 1A is constructed with respect to the control axes of the actual plant 6 having a plurality of control axes through the parameter setting method and model prediction control is executed on the respective control axes. In FIG. 5, in a working coordinate system in which an output of a first control axis is set as the horizontal axis, an output of a second control axis is set as the vertical axis, the trajectory of a target command is represented by line L1 and the trajectory of the output of the actual plant 6 is represented by line L2. As obvious from the disclosure of FIG. 5, the output of the actual plant 6 ideally tracks the target command.

In the parameter setting method illustrated in FIG. 4, the solution Qf of the Riccati equation is calculated, and the calculated Qf is set as the weighting coefficient corresponding to the terminal cost. However, the solution Qf may not be calculated in the parameter setting method. In this case, a coefficient calculated by a known technique may be employed as the weighting coefficient corresponding to the terminal cost.

Second Configuration Example

Figure 6A:
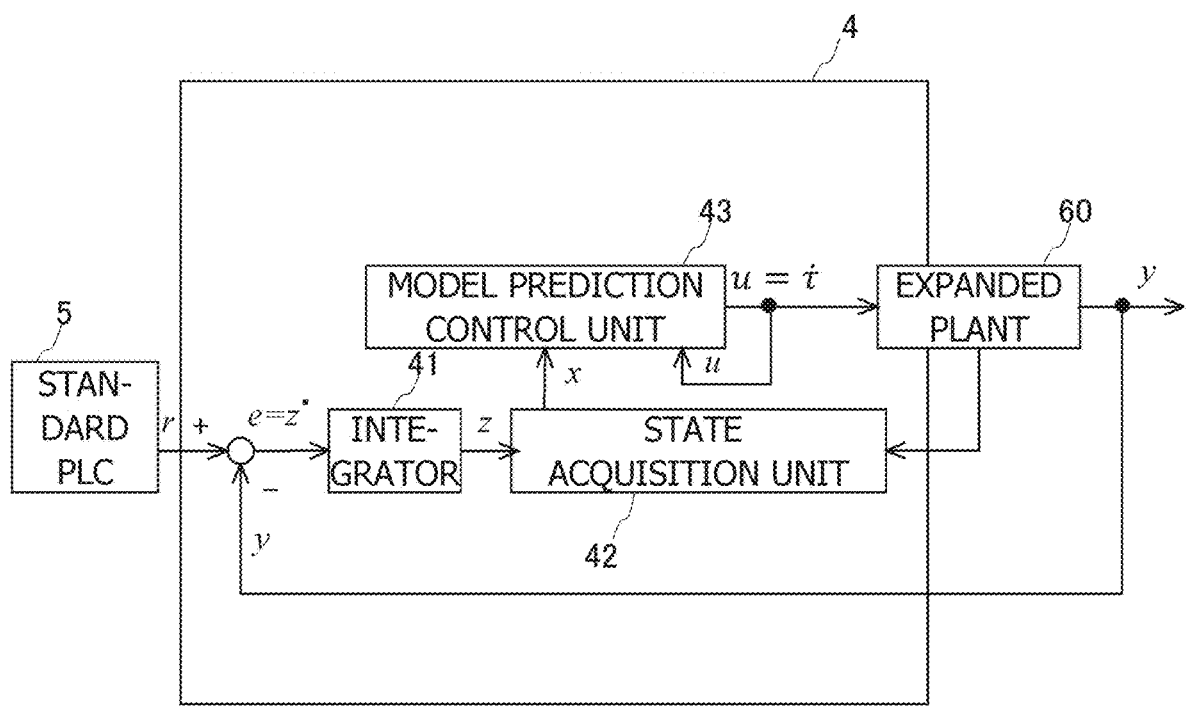
FIG. 6 is a diagram illustrating a control structure of a servo driver according to a second configuration example.
Figure 6B:
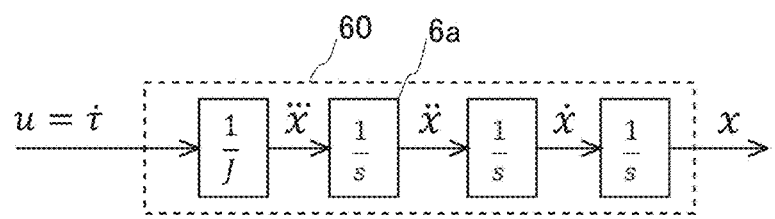

Servo control by the servo driver 4 according to a second configuration example will be described with reference to FIG. 6. In the servo driver 4 of this configuration example, the expanded plant 60 including the actual plant 6 is formed similarly to the first configuration example, model prediction control is performed by the model prediction control unit 43, and the output z of the first integrator 41 is acquired by the state acquisition unit 42 and is provided to the model prediction control. In this configuration example, the second integrator 6a and the actual plant 6 are combined to form the expanded plant 60 as illustrated in the lower part (b) of FIG. 6.

In the expanded plant 60 of the present embodiment, the control input u is a jerk input (dτ/dt). When an expanded state variable related to the expanded plant 60 is represented by Equation 30 below, the prediction model of the model prediction control unit 43 can be represented by Equation 31 below.

[Math. 28]

$$x = \begin{bmatrix} x_1 \\ \dot{x}_1 \\ \ddot{x}_1 \\ z_1 \end{bmatrix} \quad \text{(Equation 30)}$$

[Math. 29]

$$P = \begin{bmatrix} \dot{x}_1 \\ \ddot{x}_1 \\ \dfrac{u_1}{J_1} \\ (x_{f1} - x_1)K_{i1} \end{bmatrix} \quad \text{(Equation 31)}$$

Figure 7:
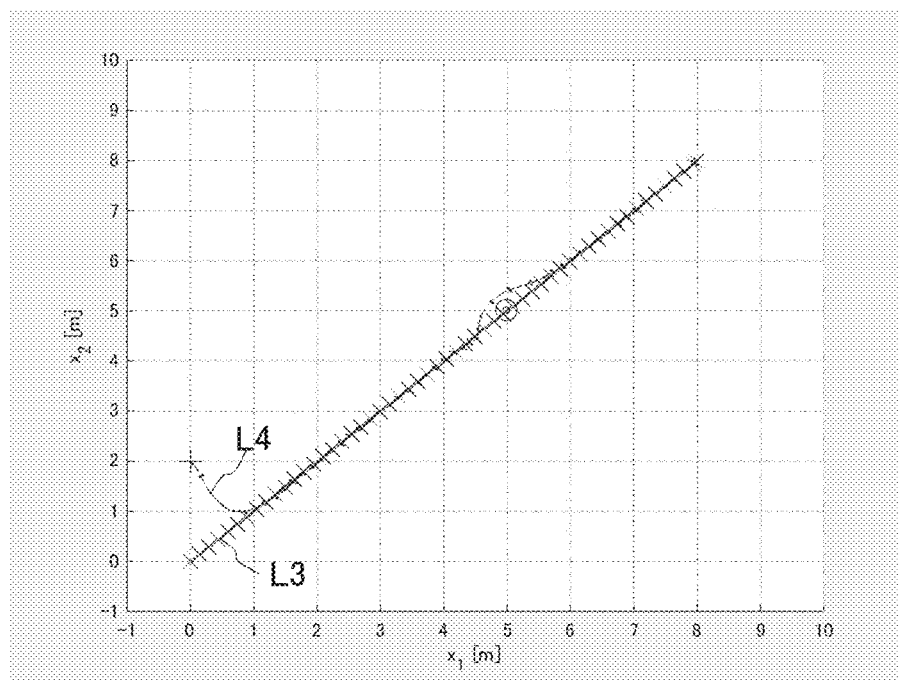
FIG. 7 is a diagram illustrating the result of trackability when an actual plant having two control axes is servo-controlled by the servo driver according to the second configuration example.

In the prediction model of Equation 31, a correlation between the expanded state variable and the jerk input u which is a control input is defined. As a result, the model prediction control unit 43 generates the jerk input u which is a control input on a real-time basis and outputs the jerk input u to the expanded plant 60. In this case, in a calculation process for calculating a stage cost of an evaluation function in model prediction control, the evaluation function (see Equations 6 to 8) for model prediction control to which the weighting coefficients are set by the parameter setting method illustrated in FIG. 4 is used. Since the model prediction control is performed through such parameter setting, an integration amount serving as a driving source of servo control which uses the model prediction control is adjusted ideally, and servo control which suppresses an overshoot can be realized. Furthermore, when a jerk input is used as the control input u, it is possible to easily suppress the largest value of jerk, and therefore, it is possible to ideally suppress vibration of the actual plant 6 during servo control. FIG. 7 illustrates a simulation result when the control structure illustrated in FIG. 1A is constructed with respect to the control axes of the actual plant 6 having a plurality of control axes through the parameter setting method and model prediction control is executed on the respective control axes. In FIG. 7, in a working coordinate system in which an output of a first control axis is set as the horizontal axis, an output of a second control axis is set as the vertical axis, the trajectory of a target command is represented by line L3 and the trajectory of the output of the actual plant 6 is represented by line L4. As obvious from the disclosure of FIG. 7, the output of the actual plant 6 ideally tracks the target command.

Third Configuration Example

Figure 8:
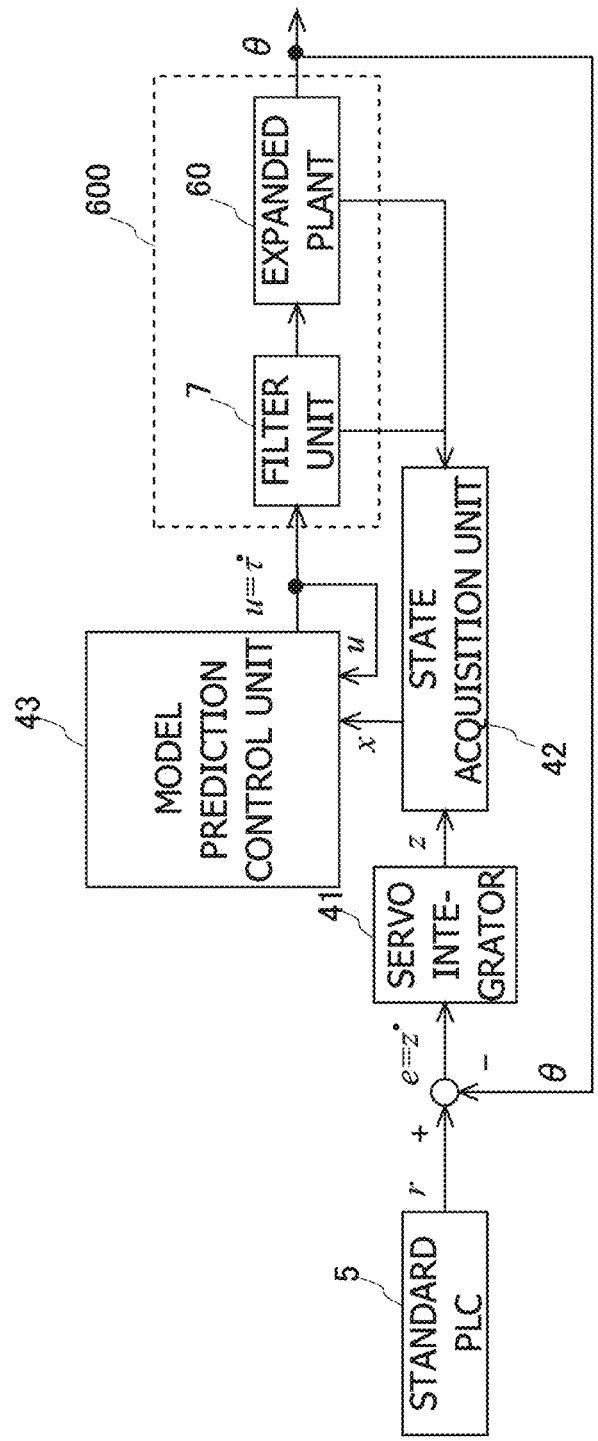
FIG. 8 is a diagram illustrating a control structure of a servo driver according to a third configuration example.

Servo control by the servo driver 4 according to a third configuration example will be described with reference to FIG. 8. In the servo driver 4 of this configuration example, the expanded plant 60 including the actual plant 6 is formed similarly to the second configuration example, a filter unit 7 is incorporated into the expanded plant 60 to form a further expanded plant 600, and model prediction control is performed by the model prediction control unit 43. In this case, a difference between a target command and the output of the further expanded plant 600 (that is, the output of the actual plant 6) is supplied to a servo integrator 41, and the output z of the servo integrator 41 and the expanded state variable of the further expanded plant 600 are acquired by the state acquisition unit 42 and are provided to the model prediction control.

Here, the filter unit 7 performs an attenuation process at a predetermined frequency with respect to the signal (in the present embodiment, the control input u (jerk input) to the further expanded plant 600) input to the filter unit 7. The predetermined frequency is preferably the frequency of vibration related to the actual plant 6 which is a direct vibration suppression target during servo control. For example, the resonant frequency of the actual plant 6 can be set as the predetermined frequency. Moreover, the attenuation process is a process of attenuating the gain of the signal (control input) related to the predetermined frequency to a desired extent. Therefore, as an example, the filter unit 7 may be configured as a notch filter in which the predetermined frequency is set as a central frequency of the attenuation process, or may be configured as a low-pass filter in which the predetermined frequency is set as a cutoff frequency of the attenuation process. When the filter unit 7 is formed in this manner, the signal (the control input u) on which an attenuation process has been performed by the filter unit 7 is input to the expanded plant 60 including the actual plant 6. As a result, suppression of vibration in the actual plant 6 is expected during servo control of the actual plant 6, and the output of the actual plant 6 can approach a target in a desired period.

Figure 9:
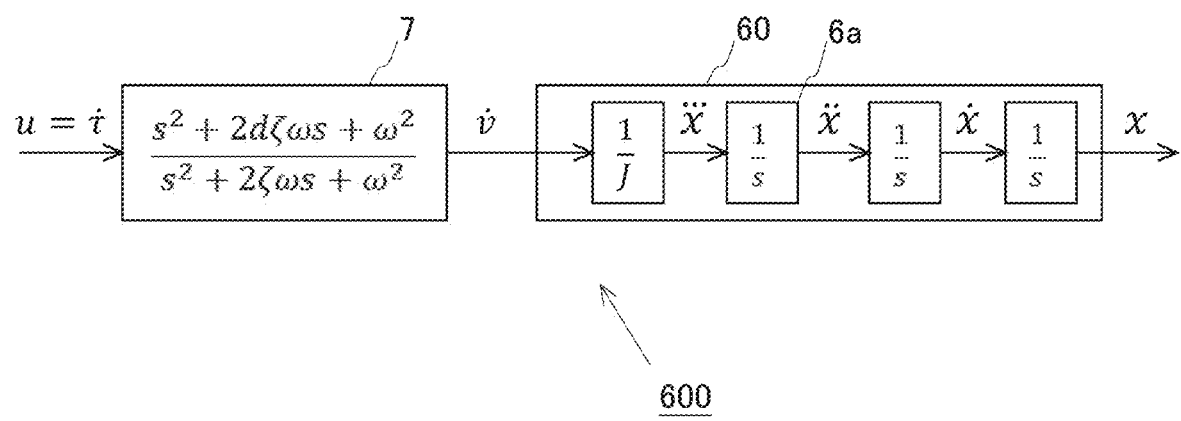
FIG. 9 is a diagram illustrating a transfer function related to a further expanded plant in the servo driver according to the third configuration example.

Here, on the basis of the fact that the further expanded plant 600 includes the filter unit 7 and the expanded plant 60, the prediction model of the model prediction control unit 43 is determined. FIG. 9 illustrates a transfer function of the filter unit 7 and a transfer function of the expanded plant 60. An output when the control input u is input to the filter unit 7 is represented by dv/dt, and the output dv/dt is set as an input to the expanded plant 60. A jerk input is set as the control input u of the present embodiment.

Figure 10:
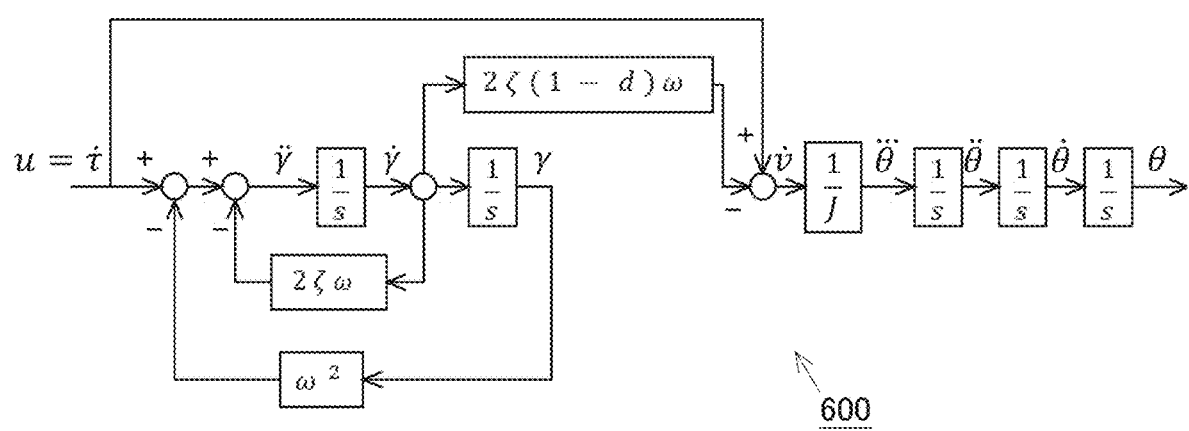
FIG. 10 is a diagram illustrating a detailed control structure related to a further expanded plant.

FIG. 10 illustrates a control structure of the further expanded plant 600 in which the transfer function of the filter unit 7 and the transfer function of the expanded plant 60 are taken into consideration. Based on the control structure, when the expanded state variable related to the further expanded plant 600 is represented by Equation 32 below, the prediction model of the model prediction control unit 43 can be represented by Equation 33 below.

[Math. 30]

$$x = \begin{bmatrix} x_1 \\ \dot{x}_1 \\ \ddot{x}_1 \\ z_1 \\ y_1 \\ \dot{y}_1 \end{bmatrix} \quad \text{(Equation 32)}$$

-continued

[Math. 31]

$$P = \begin{bmatrix} \dot{x}_1 \\ \ddot{x}_1 \\ \dfrac{u_1}{J_1} \\ (x_{f1} - x_1)K_{i1} \\ \dot{\gamma}_1 \\ -\omega_1^2 \gamma_1 - 2\zeta_1 \omega_1 \dot{\gamma}_1 + u_1 \end{bmatrix} \quad \text{(Equation 33)}$$

In the prediction model of Equation 33, a correlation between the expanded state variable and the jerk input u which is a control input is defined. As a result, the model prediction control unit 43 generates the jerk input u which is a control input on a real-time basis and outputs the jerk input u to the filter unit 7 included in the further expanded plant 600. Here, when the prediction model (a prediction model represented by Equation 33) of this configuration example is compared with the prediction model (a prediction model represented by Equation 31) of the second configuration example, it is understood that the order of the prediction model of this configuration example is larger than that of the second configuration example by an amount corresponding to the state variable related to the filter unit 7. Meanwhile, it cannot be said that the state variable related to the filter unit 7 has a correlation with evaluation (that is, evaluation of optimality based on an evaluation function) of optimality of model prediction control. By taking this into consideration, as for the state quantity cost among the stage costs of the evaluation function for model prediction control of this configuration example, a weighting coefficient corresponding to the state quantity cost is generated using the weighting coefficient obtained in the second configuration example.

Specifically, in the weighting coefficient calculation step (S103) of the parameter setting method illustrated in FIG. 4, the weighting coefficients Qf, Q, and R of the evaluation function are calculated according to a prediction model that does not include the state variable of the filter unit 7 (that is, the prediction model of the second configuration example (the prediction model represented by Equation 31)). Since the weighting coefficient Q related to the state quantity cost among these weighting coefficients corresponds to the expanded plant 60 at this time point, the dimension thereof is different from the dimension of the expanded state variable of the further expanded plant 600. Therefore, in order for the dimension of the weighting coefficient Q to correspond to the further expanded plant 600, zeros are added to the weighting coefficient Q by an amount corresponding to the dimension corresponding to the state variable related to the filter unit 7, and a new weighting coefficient Q' is generated so that the dimension of the weighting coefficient Q corresponds to the dimension of the expanded state variable of the expanded plant 600.

Here, FIG. 11 illustrates an example of the weighting coefficient Q' related to the state quantity cost. The weighting coefficient Q' in FIG. 11 and the weighting coefficient Q which is the base thereof correspond to model prediction control in which the number of control axes is two. The prediction model (a prediction model represented by Equation 33) of this configuration example includes a larger number of state variables than that of the prediction model (the prediction model represented by Equation 31) of the second configuration example by the number (two) of state variables related to the filter unit 7. Therefore, zeros are added to the weighting coefficient Q by an amount corresponding to the number of dimensions corresponding to this difference to generate a new weighting coefficient Q', which is illustrated in FIG. 11. As described above, since the weighting coefficient Q' illustrated in FIG. 11 corresponds to model prediction control in which the number of control axes is two, zeros are added by an amount corresponding to the difference in the number of dimensions corresponding to two control axes.

In the setting step (S104) of the parameter setting method illustrated in FIG. 4, the first weighting coefficient Qf (the weighting coefficient Qf calculated according to the prediction model of the second configuration example) is set as the weighting coefficient corresponding to the terminal cost, the new second weighting coefficient Q' is set as the weighting coefficient corresponding to the state quantity cost, and the third weighting coefficient R (the weighting coefficient R calculated according to the prediction model of the second configuration example) is set as the weighting coefficient corresponding to the control input cost.

Figure 12:
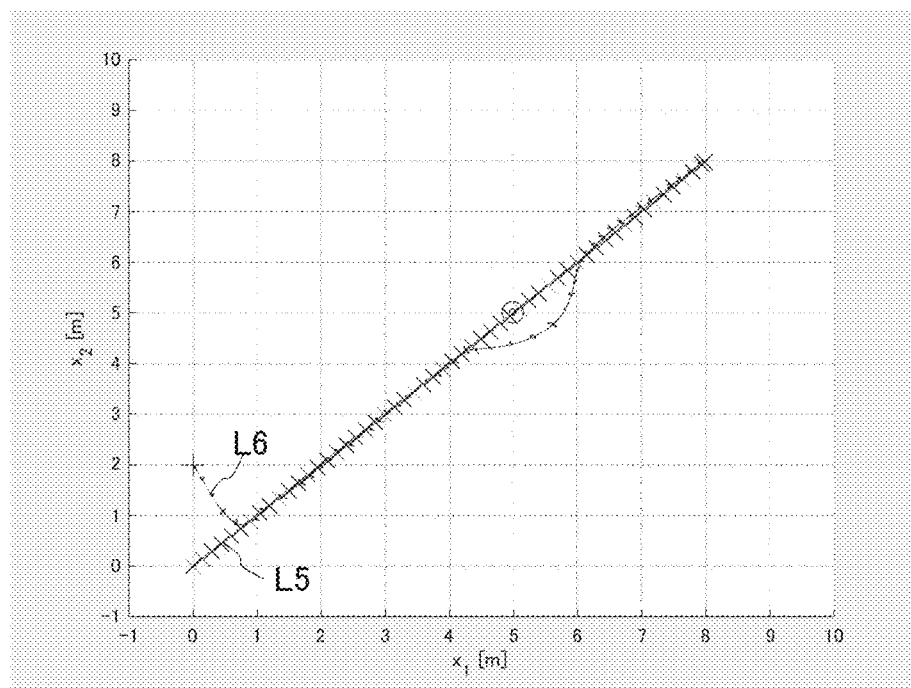
FIG. 12 is a diagram illustrating the result of trackability when an actual plant having two control axes is servo-controlled by the servo driver according to the third configuration example.

Since the model prediction control is performed through such parameter setting, an integration amount serving as a driving source of servo control which uses the model prediction control is adjusted ideally, and servo control which suppresses an overshoot can be realized. Furthermore, since the jerk input is set as the control input u and an attenuation process is performed by the filter unit 7, it is possible to ideally suppress vibration of the actual plant 6 during servo control. FIG. 12 illustrates a simulation result when the control structure illustrated in FIG. 1A is constructed with respect to the control axes of the actual plant 6 having a plurality of control axes through the parameter setting method and model prediction control is executed on the respective control axes. In FIG. 12, in a working coordinate system in which an output of a first control axis is set as the horizontal axis, an output of a second control axis is set as the vertical axis, the trajectory of a target command is represented by line L5 and the trajectory of the output of the actual plant 6 is represented by line L6. As obvious from the disclosure of FIG. 12, the output of the actual plant 6 ideally tracks the target command.

Fourth Configuration Example

In a fourth configuration example, a control structure which is formed in the standard PLC 5 and includes a model prediction control unit 53 corresponding to the model prediction control unit 43 will be described with reference to FIG. 13. The standard PLC 5 includes a command generation unit 50, an integrator 51, a state acquisition unit 52, a model prediction control unit 53, and an expanded plant model 560. Since the integrator 51, the state acquisition unit 52, and the model prediction control unit 53 substantially correspond to the integrator 41, the state acquisition unit 42, and the model prediction control unit 43 illustrated in FIGS. 3, 6, and 8, respectively, the detailed description thereof will be omitted.

The command generation unit 50 generates a target command r for instructing the output of the actual plant 6. In this configuration example, the target command r is provided to model prediction control of the model prediction control unit 53 rather than being supplied from the standard PLC 5 directly to the servo driver 4. Moreover, the expanded plant model 560 has an expansion system model including a plant model that models the expanded plant 60 illustrated in FIGS. 3 and 6 or the further expanded plant 600 illustrated in FIG. 8 and simulates the output of the expanded plant 60 or the like using the expansion system model. The simulation result is used as an output y of the expanded plant model 560. The output y of the expanded plant model 560 is fed back to an input side of the integrator 51 by a feedback system.

Here, in this configuration example, an offset e (e=r−y) between the target command r generated by the command generation unit 50 and the feedback output y of the expanded plant model 560 is input to the integrator 51. An output z of the integrator 51 is input to the model prediction control unit 53 through the state acquisition unit 52.

Here, the state acquisition unit 52 acquires the value of a state variable included in the state x related to the expansion system model, provided to the model prediction control performed by the model prediction control unit 53. The acquisition of the state variable by the state acquisition unit 52 is substantially the same as acquisition of the state variable by the state acquisition unit 42 illustrated in the first to third configuration examples described above. The model prediction control unit 53 executes model prediction control using the state x acquired by the state acquisition unit 52 and the input u to the expanded plant model 560 output by the model prediction control unit 53. As for the model prediction control performed by the model prediction control unit 53, an integral term represented by a product of the offset e and the predetermined integral gain is included in the prediction model used in the model prediction control substantially similarly to the model prediction control performed by the model prediction control unit 43 illustrated in the first to third configuration examples described above.

Figure 13:
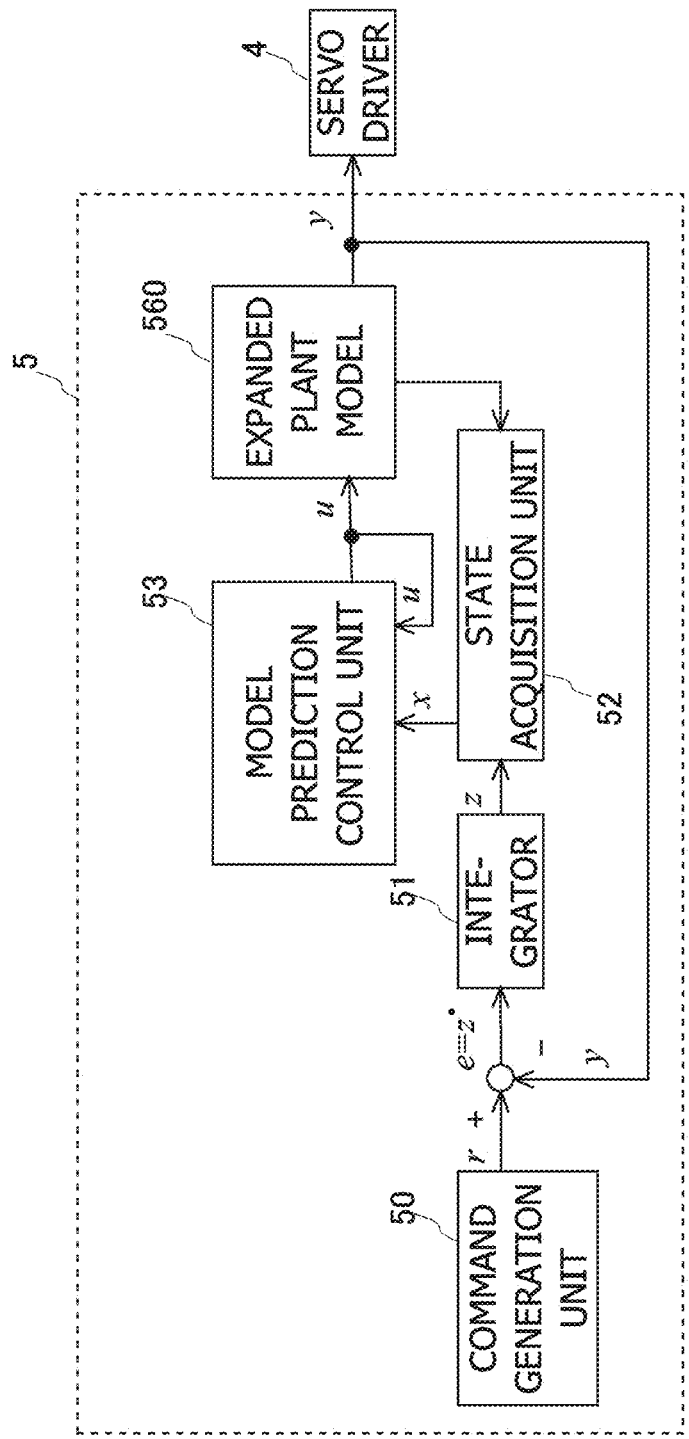
FIG. 13 is a diagram illustrating a control structure of a standard PLC according to a fourth configuration example.

Due to the control structure formed in this manner, the standard PLC 5 illustrated in FIG. 13 can supply the output y which is the simulation result of the expanded plant model 560 to the servo driver 4 as a command for ideally tracking the target command r while suppressing the output of the actual plant 6 from entering an overshoot state. That is, the standard PLC 5 can suppress occurrence of a steady-state offset in the output of the actual plant 6 while performing model prediction control even when the target trajectory changes frequently according to the target command r although the control amount of the actual plant 6 which is the actual control target is not fed back directly.

In the standard PLC 5 having the control structure configured in this manner, the parameter setting method illustrated in FIG. 4 can be applied to the setting of the weighting coefficients of the evaluation function in the model prediction control. When model prediction control is performed in the standard PLC 5 through such parameter setting, an integration amount serving as a driving source of servo control is adjusted ideally in the servo control for tracking using the model prediction control, it is possible to realize servo control suppressing an overshoot.

Fifth Configuration Example

Figure 14:
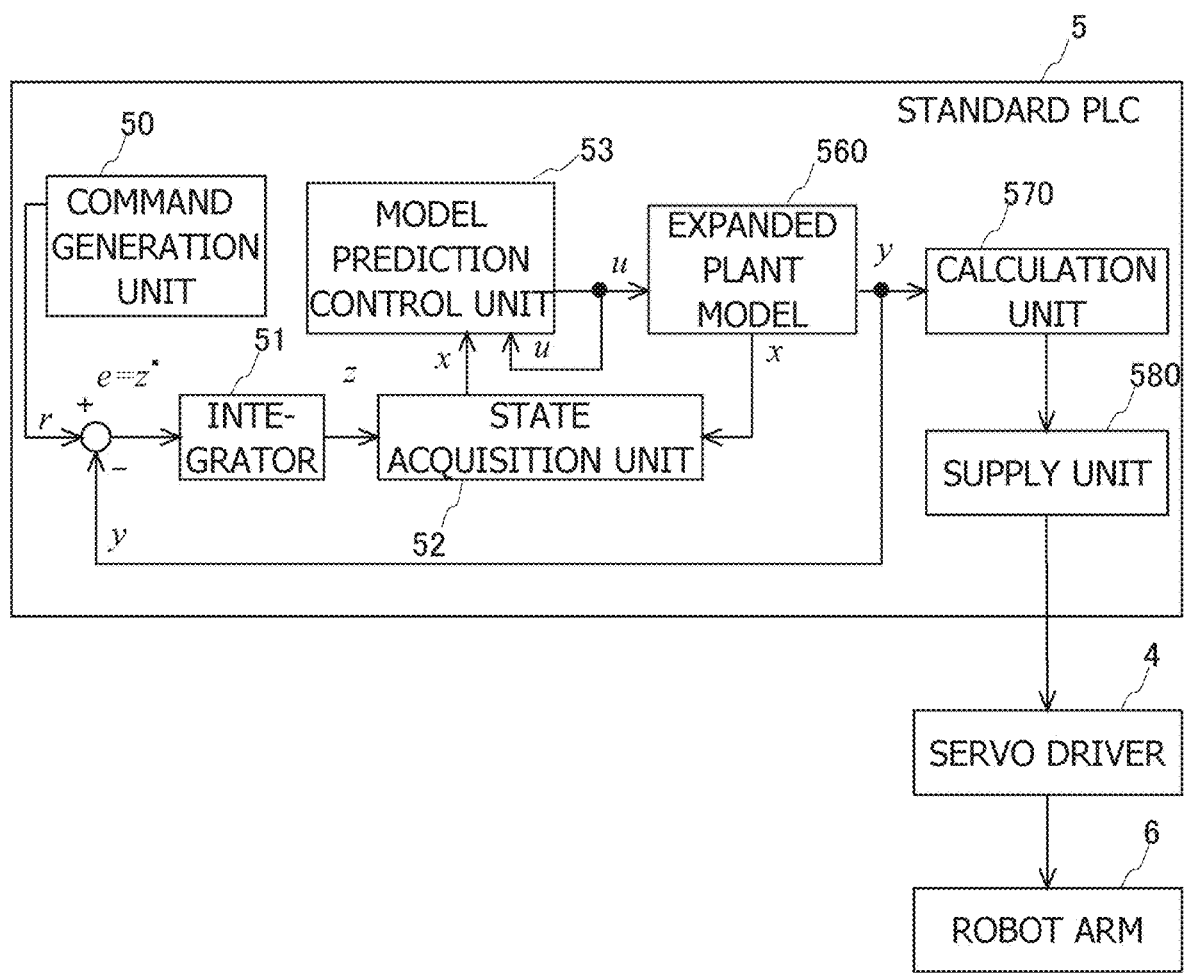
FIG. 14 is a diagram illustrating a control structure of a standard PLC according to a fifth configuration example.
Figure 15A:
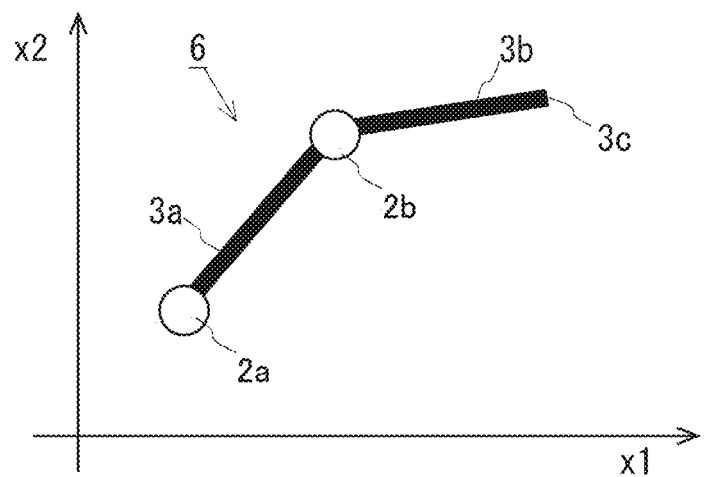
FIGS. 15A and 15B are diagrams illustrating an overall configuration of a robot arm which is a plant according to the fifth configuration example.

A fifth configuration example relates to a modification of the standard PLC 5 having a control structure including the model prediction control unit 53 similarly to the fourth configuration example and will be described with reference to FIGS. 14 and 15. FIG. 14 illustrates a control structure of the standard PLC 5 according to this configuration example, and functional units substantially the same as those of the standard PLC 5 of the fourth configuration example will be denoted by the same reference numerals, and the detailed description thereof will be omitted. In this configuration example, the plant 6 is a robot arm 6 illustrated in FIG. 15A.

Therefore, the expanded plant model 560 has an expansion system model to which the structure of the robot arm 6 is applied and performs simulation of the expanded plant model 60 using the expansion system model.

Here, the robot arm 6 which is a plant will be described with reference to FIG. 15A. The robot arm 6 has two motors 2 (motors 2a and 2b) driven according to a target command from the standard PLC 5. In the robot arm 6, one end of a first arm 3a is attached to an output shaft of the motor 2a so that the first arm 3a is rotated using the motor 2a as a first joint. Furthermore, a motor 2b is disposed at the other end of the first arm 3a, and one end of a second arm 3b is attached to an output shaft of the motor 2b so that the second arm 3b is rotated using the motor 2b as a second joint. A tip 3c of the second arm 3b is an output unit of the robot arm 6, and an end effector for grasping a predetermined object, for example, is attached to the tip 3c. In the robot arm 6, a plane of rotation of the first arm 3a is the same plane as a plane of rotation of the second arm 3b, and an x1-axis and an x2-axis are set as orthogonal coordinates for defining the plane of rotation. This orthogonal coordinates are working coordinates related to the robot arm 6, and the position of the tip 3c of the robot arm 6 can be defined on the orthogonal coordinates. The command generation unit 50 of this configuration example generates a predetermined command r that the tip 3c of the robot arm 6 has to track. This command r is based on the working coordinate system (see FIGS. 15A and 15B) related to the robot arm 6.

Next, a calculation unit 570 will be described. An output y of the expanded plant model 560 obtained when the control input u is input is based on the working coordinate system illustrated in FIGS. 15A and 15B. Meanwhile, the motors 2a and 2b that form the robot arm 6 are actuators that are rotated, and a rotation coordinate system which is an independent coordinate system different from the working coordinate system is set to the respective motors for servo control performed by the servo driver 4. Therefore, the output y is not used as a target command for driving the motors 2a and 2b as it is. Therefore, the calculation unit 570 performs a calculation process for converting the output y of the expanded plant model 560 to a target command based on the rotation coordinate system of the motors.

Figure 15B:
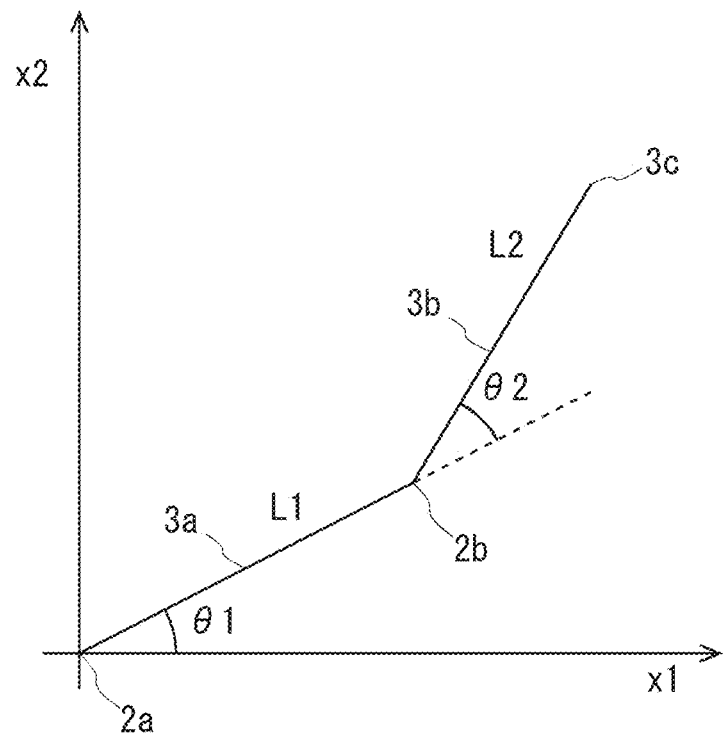

The calculation process of the calculation unit 570 is performed according to a geometric relation of an apparatus structure of the robot arm 6. FIG. 15B illustrates the apparatus structure of the robot arm 6. In FIG. 15B, the first joint at which the motor 2a is disposed is positioned at the origin of the working coordinate system in order to simplify the description. When the length of the first arm 3a is L1, the length of the second arm 3b is L2, and the position of the tip 3c is $(x_1, x_2)$, the rotation angles $\theta 1$ and $\theta 2$ of the motors 2a and 2b can be represented by Equation 34 below when the geometric relation of the apparatus structure of the robot arm 6 is taken into consideration. The rotation angle $\theta 1$ of the motor 2a is defined as the angle between the x1-axis and the first arm 3a, and the rotation angle $\theta 2$ of the motor 2b is defined as the angle between the first arm 3a and the second arm 3b.

[Math. 32]

$$\theta_2 = a\tan2 \left( \frac{\pm\sqrt{(2L_1L_2)^2 - \{L_0^2 - (L_1^2 + L_2^2)\}^2}}{2L_1L_2}, \frac{L_0^2 - (L_1^2 + L_2^2)}{2L_1L_2} \right) \quad \text{(Equation 34)}$$

where $L_0^2 = x_1^2 + x_2^2$ $$\theta_1 = a\tan2\left(\frac{-k_s x_1 + k_c x_2}{k_c^2 + k_s^2}, \frac{k_c x_1 + k_s x_2}{k_c^2 + k_s^2}\right)$$

where
$k_c = L_1 + L_2\cos\theta_2$
$k_s = L_2\sin\theta_2$

Here, a function a tan 2 in Equation 34 is a function that returns a drift angle of (x,y) in the coordinate system when represented by a tan 2(x,y).

The angles θ1 and θ2 calculated from the output y of the expanded plant model 560 by the calculation unit 570 in this manner are the target commands related to the positions (angles) of the motors, ideal for servo-controlling the motors 2a and 2b. Therefore, the calculation result obtained by the calculation unit 570 is supplied to the servo driver 4 by a supply unit 580 and is provided to servo control (feedback control) in the servo driver 4. In the control system of the present embodiment, the model prediction control performed in the standard PLC 5 is performed on the basis of the working coordinate system related to the robot arm 6. Therefore, it is easy to allow the output of the robot arm 6 to ideally track a predetermined command r based on the working coordinate system. Furthermore, through the calculation process of the calculation unit 570, the result of the model prediction control based on the working coordinate system can be converted to a target command which can be ideally applied to the servo control of the motors 2a and 2b based on the rotation coordinate system. In this case, since the calculation process is based on the geometric relation of the apparatus structure of the robot arm 6, it is possible to ideally avoid occurrence of an output error (position error) of the robot arm 6 resulting from accumulation of computation errors. This is very useful effect in considering the trackability of the robot arm 6.

In the standard PLC 5 having the control structure configured in this manner, the parameter setting method illustrated in FIG. 4 can be applied to the setting of the weighting coefficients of the evaluation function in the model prediction control. Particularly, in this configuration example, since the prediction model of the model prediction control unit 53 in the standard PLC 5 is based on the working coordinate system which is an orthogonal coordinate system, it is possible to immediately set the weighting coefficients Qf, Q, and R of the evaluation function according to the parameter setting method and ideally alleviate the load related to the setting. When model prediction control is performed in the standard PLC 5 through such parameter setting, an integration amount serving as a driving source of servo control is adjusted ideally in the servo control for tracking using the model prediction control, it is possible to realize servo control suppressing an overshoot.

Sixth Configuration Example

When the actual plant 6 has a plurality of control axes, the control structure for servo control illustrated in the first to third configuration examples is preferably formed in the standard PLC 5 as illustrated in the fourth and fifth configuration examples. With such a configuration, it is not necessary to adapt the servo driver 4 to the respective control axes, and it is easy to construct an entire system for servo control of the actual plant 6. The system may naturally be constructed after the servo driver 4 is adapted to the respective control axes.

REFERENCE SIGNS LIST

1 Network
2 Motor
3 Load device
4 Servo driver
5 Standard PLC
6 Plant
6a Second integrator
7 Filter unit
41 First integrator
42 State acquisition unit
43 Model prediction control unit
50 Command generation unit
51 Integrator
52 State acquisition unit
53 Model prediction control unit
60 Expanded plant
560 Expanded plant model
570 Calculation unit
580 Supply unit
600 Further expanded plant

The invention claimed is:

1. A method for setting control parameters for model prediction control related to a predetermined control target, the method being executed by a control device having a first integrator to which an offset between a predetermined target command and an output of the predetermined control target corresponding to an actual target device which is an actual target of servo control is input, in order to make an output of the actual target device track the predetermined target command, wherein
   the control device includes a model prediction control unit which has a prediction model that defines a correlation between a predetermined first state variable related to first control target including at least the predetermined control target and a control input to the first control target in a form of a predetermined state equation and which performs the model prediction control based on the prediction model according to a predetermined evaluation function in a prediction section having a predetermined time width with respect to the predetermined target command and outputs a value of the control input at least at an initial time point of the prediction section,
   a predetermined state variable which is a portion of the predetermined first state variable and which is related to the predetermined control target includes a predetermined integral term represented by a product of the offset and a predetermined integral gain, and
   the setting method includes:
   a time response determining step of determining a desired time response in an optimum servo control structure which includes a virtual integrator corresponding to the first integrator and is related to a virtual control target corresponding to the first control target and in which, when a virtual target command for the virtual control target is r1, a virtual control input to the virtual control target is a virtual control input u1, a virtual output of the virtual control target is y1, and the predetermined state variable is x, the virtual control input u1 is represented by Equation 1 below including a state feedback gain $K_F$ and an integral gain $K_I$;

a gain calculation step of calculating the state feedback gain $K_F$ and the integral gain $K_I$ corresponding to the desired time response;

a weighting coefficient calculation step of calculating a second weighting coefficient Q and a third weighting coefficient R in a predetermined Riccati equation represented by Equation 3 below on the basis of the state feedback gain $K_F$ and the integral gain $K_I$ when the control input to the first control target is u, the output of the first control target is y, the offset is e, the predetermined state variable is x, a first predetermined coefficient is A, a second predetermined coefficient is B, a third predetermined coefficient is C, a first weighting coefficient is Qf and a state equation related to the predetermined control target is represented by Equation 2 below; and a setting step of setting the second weighting coefficient Q as a weighting coefficient corresponding to a state quantity cost which is a stage cost related to the predetermined state variable and setting the third weighting coefficient R as a weighting coefficient corresponding to a control input cost which is a stage cost related to the control input in the predetermined evaluation function,

[Math. 1]

$$u1 = -K_F x + K_I \int (r1 - y1) dt \quad \text{(Equation 1)}$$

$$\begin{cases} \dot{x} = Ax + Bu \\ \dot{z} = -Cx + r \end{cases}, \begin{bmatrix} \dot{x} \\ \dot{z} \end{bmatrix} = \begin{bmatrix} A & 0 \\ -C & 0 \end{bmatrix} \begin{bmatrix} x \\ z \end{bmatrix} + \begin{bmatrix} B \\ 0 \end{bmatrix} u + \begin{bmatrix} 0 \\ r \end{bmatrix} \quad \text{(Equation 2)}$$

where $e = r - y = \dot{z}$ $$Q_f A_e + A_e^T Q_f - Q_f B_e R^{-1} B_e^T Q_f + Q = 0 \quad \text{(Equation 3)}$$

where $A_e = \begin{bmatrix} A & 0 \\ C & 0 \end{bmatrix}, B_e = \begin{bmatrix} B \\ 0 \end{bmatrix}$ wherein the control input is a jerk input to the predetermined control target, the first control target includes an additional integrator that performs a predetermined integration process with respect to the jerk input, and the prediction model defines a correlation between the jerk input and the predetermined first state variable including the predetermined state variable related to the predetermined control target and a state variable related to the additional integrator.

2. The control parameter setting method for model prediction control according to claim 1, wherein in the weighting coefficient calculation step, the first weighting coefficient Qf is further calculated, in the setting step, the first weighting coefficient Qf is further set as the weighting coefficient corresponding to the terminal cost related to the predetermined state variable.

3. The control parameter setting method for model prediction control according to claim 1, wherein the first control target includes the predetermined control target only, and a portion of the predetermined first state variable is identical to the predetermined state variable.

4. The control parameter setting method for model prediction control according to claim 1, wherein a filter unit that performs an attenuation process at a predetermined frequency with respect to a control input based on the predetermined target command is included in the predetermined control target and the first control target including the additional integrator whereby a second control target is formed in the control device, the control parameter setting method for the model prediction control is executed by the control device, a state variable related to the second control target includes a state variable related to the filter unit in addition to the predetermined first state variable, the prediction model defines a correlation between the jerk input and the predetermined first state variable and the state variable related to the filter unit, in the weighting coefficient calculation step, the second weighting coefficient Q and the third weighting coefficient R are calculated on the basis of the state feedback gain $K_F$ and the integral gain $K_I$, and zeros are added to the second weighting coefficient as a weighting coefficient corresponding to the state variable related to the filter unit so as to correspond to the second control target to obtain a new second weighting coefficient, and in the setting step, the new second weighting coefficient is set as the weighting coefficient corresponding to the state quantity cost and the third weighting coefficient R is set as the weighting coefficient corresponding to the control input cost in the predetermined evaluation function.

5. The control parameter setting method for model prediction control according to claim 1, wherein a filter unit that performs an attenuation process at a predetermined frequency with respect to a control input based on the predetermined target command is included in the predetermined control target and the first control target including the additional integrator whereby a second control target is formed in the control device, the control parameter setting method for the model prediction control is executed by the control device, a state variable related to the second control target includes a state variable related to the filter unit in addition to the predetermined first state variable, the prediction model defines a correlation between the jerk input and the predetermined first state variable and the state variable related to the filter unit, in the weighting coefficient calculation step, the first weighting coefficient Qf, the second weighting coefficient Q, and the third weighting coefficient R corresponding to the first control target are calculated on the basis of the state feedback gain $K_F$ and the integral gain $K_I$, and zeros are added to the second weighting coefficient as a weighting coefficient corresponding to a state variable related to the filter unit so as to correspond to the second control target to obtain a new second weighting coefficient, and in the setting step, the first weighting coefficient Qf is set as the weighting coefficient corresponding to the terminal cost, the new second weighting coefficient is set as the weighting coefficient corresponding to the state quantity cost, and the third weighting coefficient R is set as the weighting coefficient corresponding to the control input cost in the predetermined evaluation function.

6. The control parameter setting method for model prediction control according to claim 4, wherein the filter unit is configured as a notch filter in which the predetermined frequency is used as a central frequency of the attenuation process or a low-pass filter in which the predetermined frequency is used as a cutoff frequency of the attenuation process.

* * * * *